No. 720,086. PATENTED FEB. 10, 1903.
J. A. TURCK.
CALCULATING MACHINE.
APPLICATION FILED JUNE 17, 1901. RENEWED DEC. 8, 1902.
NO MODEL. 8 SHEETS—SHEET 1.

WITNESSES, INVENTOR,
Howard A Lamprey Joseph A. Turck
Joseph R Bullock Jr By Warren R. Perce
ATT'Y.

No. 720,086. PATENTED FEB. 10, 1903.
J. A. TURCK.
CALCULATING MACHINE.
APPLICATION FILED JUNE 17, 1901. RENEWED DEC. 8, 1902.
NO MODEL. 8 SHEETS—SHEET 2.
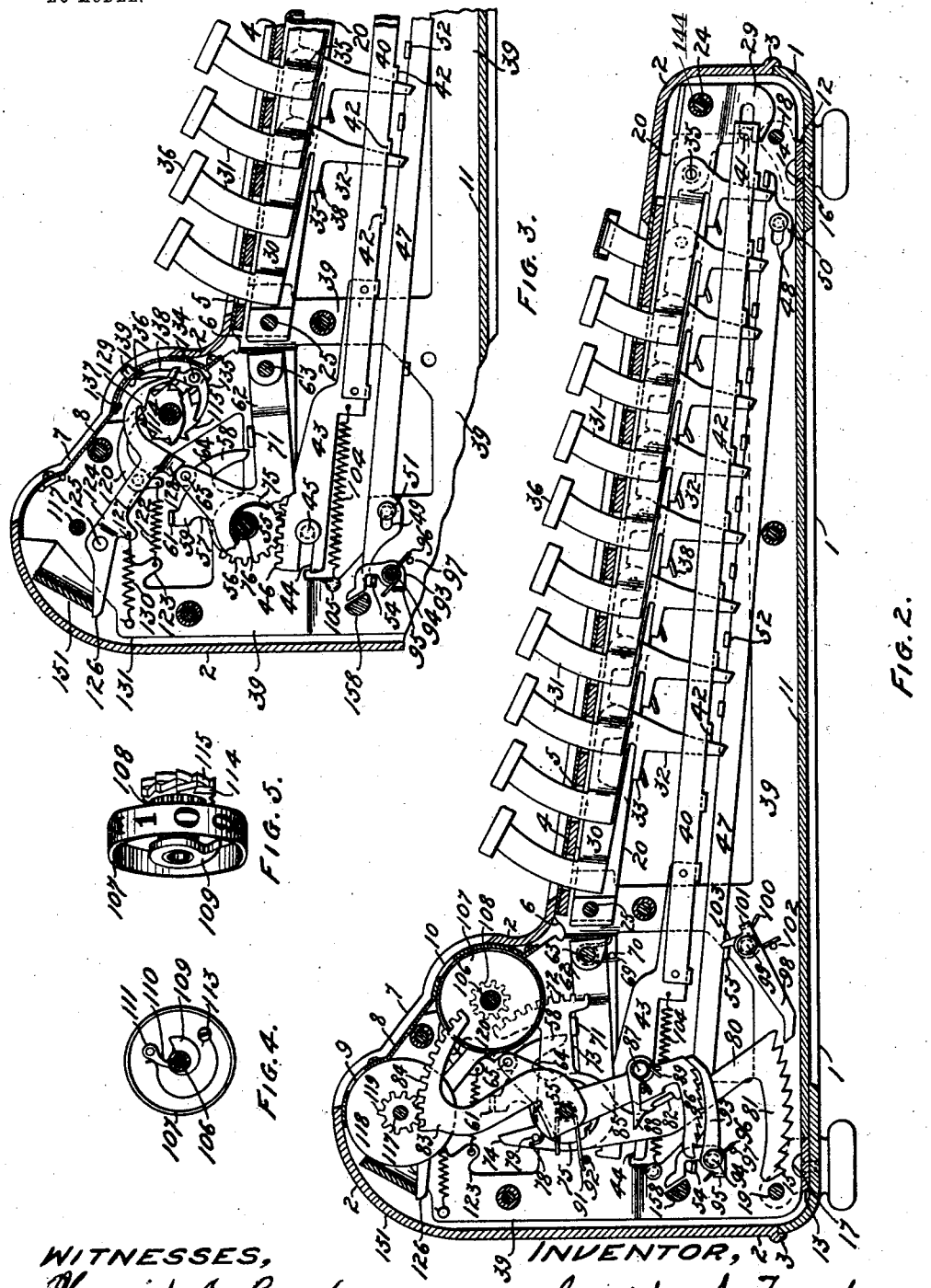
WITNESSES, INVENTOR,
Howard H. Lamprey Joseph A. Turck
Joseph R. Bullock Jr. By Warren R. Perce ATT'Y.

No. 720,086. PATENTED FEB. 10, 1903.
J. A. TURCK.
CALCULATING MACHINE.
APPLICATION FILED JUNE 17, 1901. RENEWED DEC. 8, 1902.
NO MODEL. 8 SHEETS—SHEET 3.

WITNESSES, INVENTOR,
Howard A. Lumpry Joseph A. Turck
Joseph R. Bullock Jr BY Warren R. Perce
ATT'Y.

THE NORRIS PETERS CO., PHOTO-LITHO., WASHINGTON, D. C.

No. 720,086. PATENTED FEB. 10, 1903.
J. A. TURCK.
CALCULATING MACHINE.
APPLICATION FILED JUNE 17, 1901. RENEWED DEC. 8, 1902.
NO MODEL. 8 SHEETS—SHEET 4.
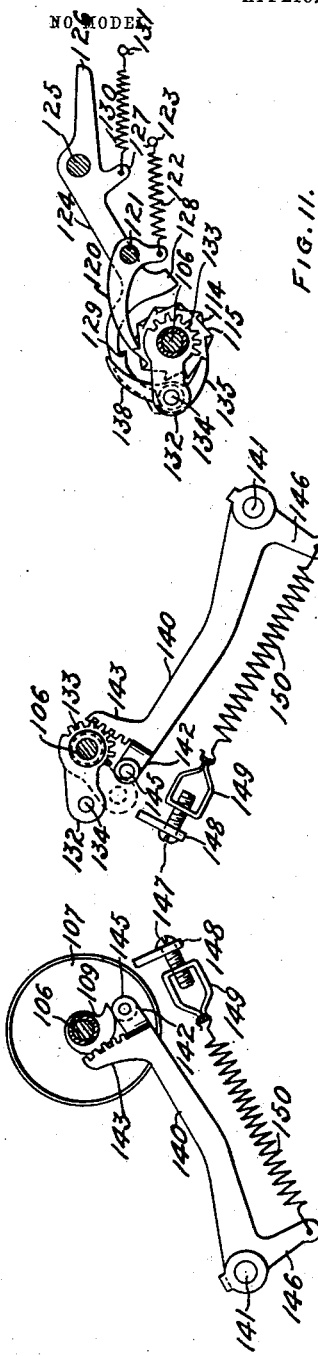
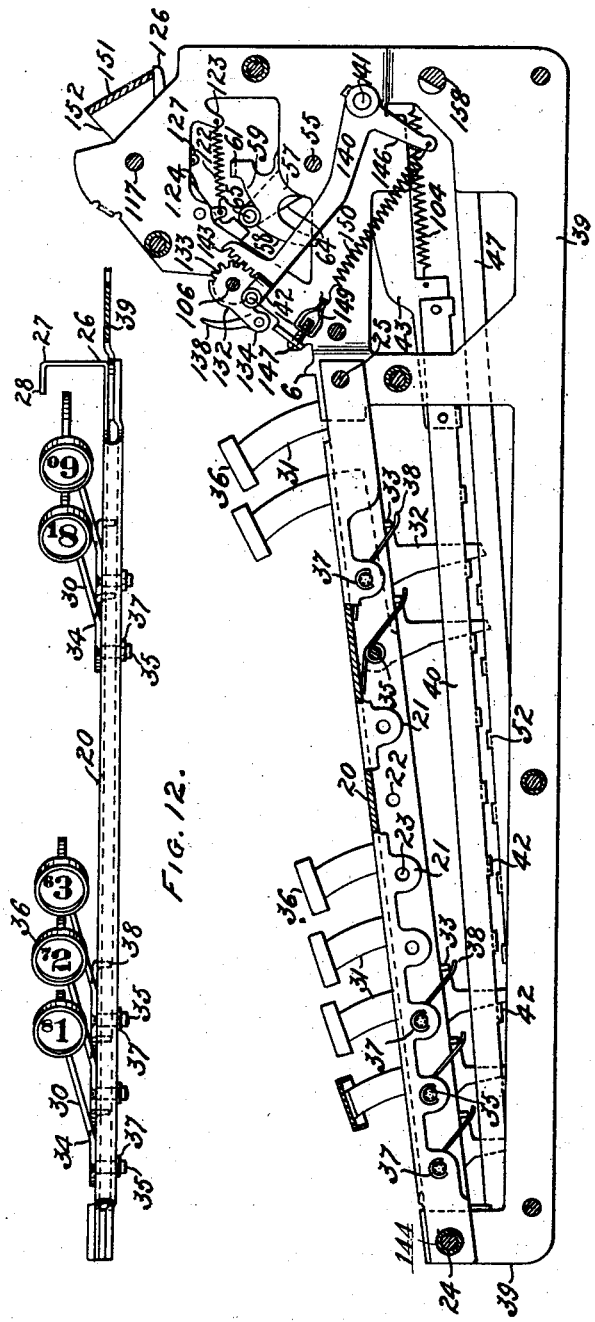

No. 720,086. PATENTED FEB. 10, 1903.
J. A. TURCK.
CALCULATING MACHINE.
APPLICATION FILED JUNE 17, 1901. RENEWED DEC. 8, 1902.
NO MODEL. 8 SHEETS—SHEET 5.
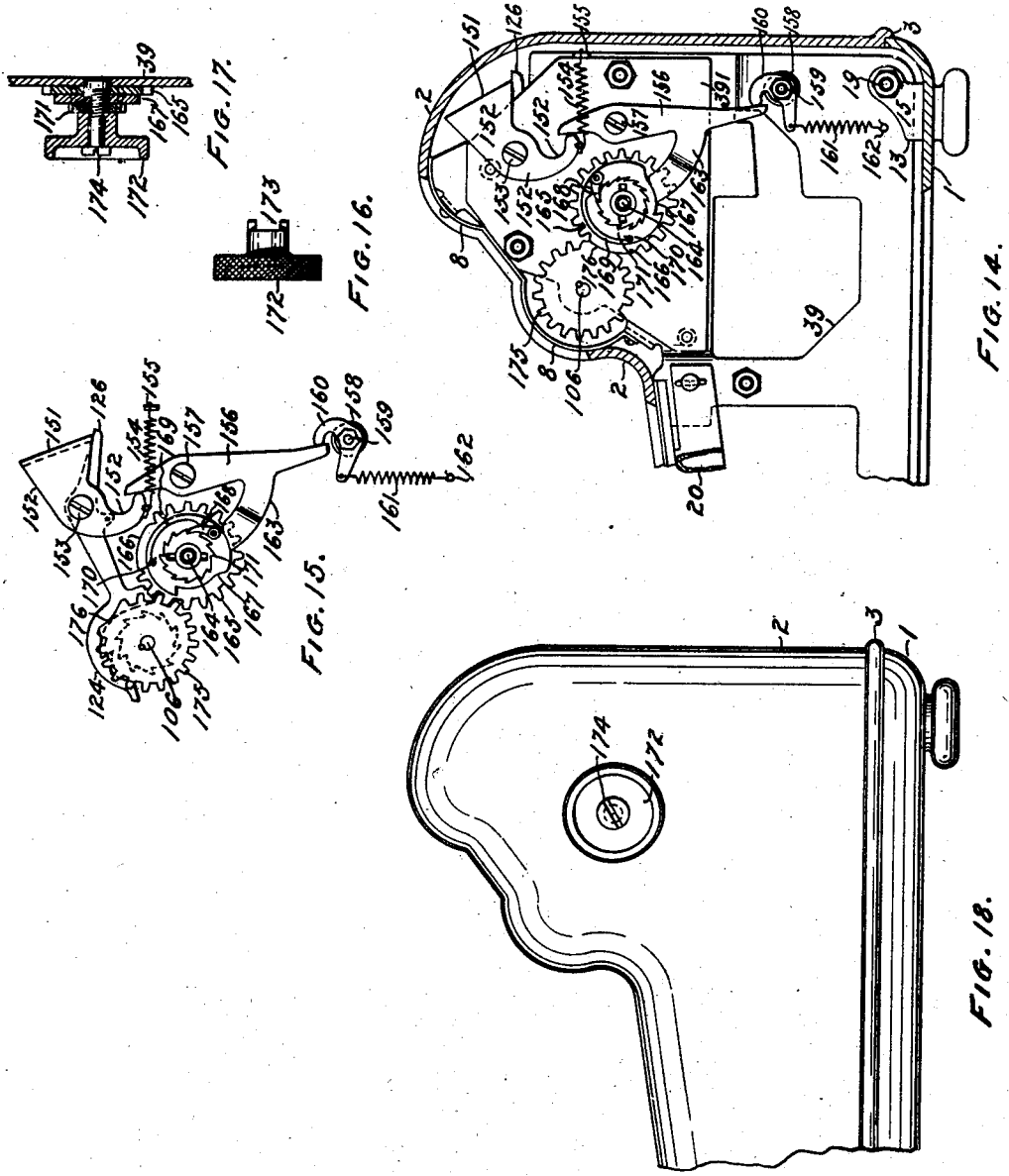
WITNESSES, INVENTOR,
Howard A Lamprey Joseph A. Turck
Joseph R Bullock Jr By Warren R. Perce
ATT'Y.

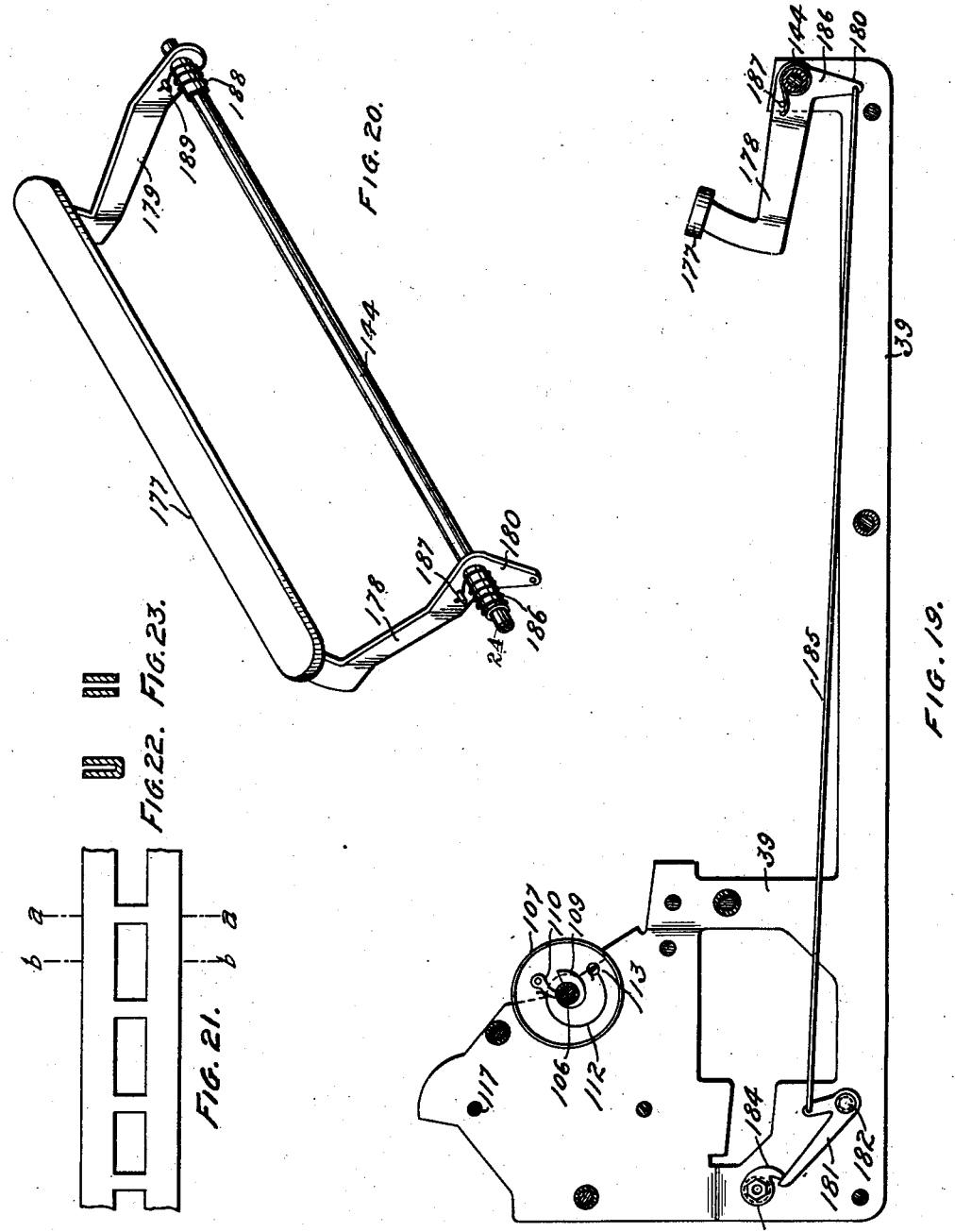

No. 720,086. PATENTED FEB. 10, 1903.
J. A. TURCK.
CALCULATING MACHINE.
APPLICATION FILED JUNE 17, 1901. RENEWED DEC. 8, 1902.
NO MODEL. 8 SHEETS—SHEET 7.
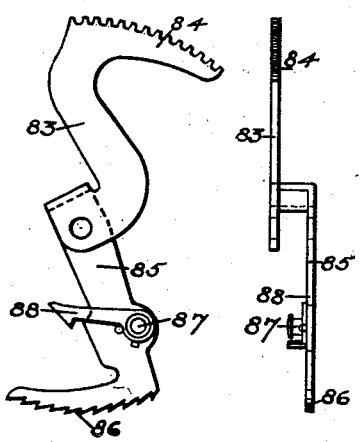
FIG. 24.   FIG. 25.
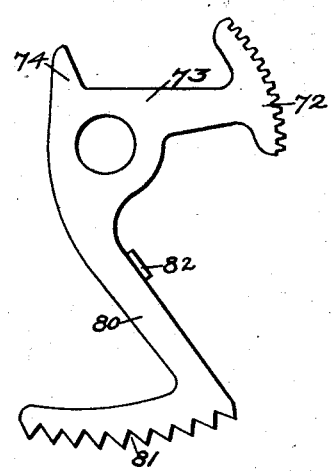
FIG. 26.
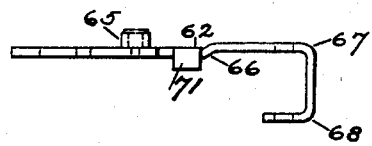
FIG. 27.
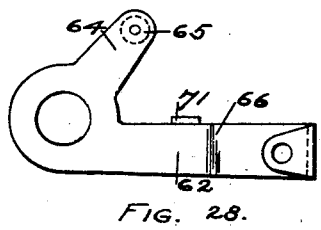
FIG. 28.
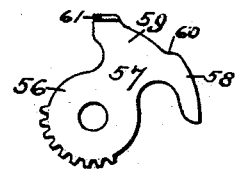
FIG. 29.
 
FIG. 30.   FIG. 31.
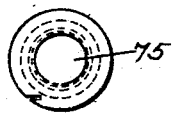 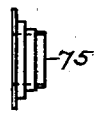  
FIG. 32.   FIG. 33.   FIG. 34.   FIG. 35.
WITNESSES.   INVENTOR.
Annie E. Pierce.   Joseph A. Turck
Mabel Foster.   By Warren R. Pierce
   ATTY.

No. 720,086. PATENTED FEB. 10, 1903.
J. A. TURCK.
CALCULATING MACHINE.
APPLICATION FILED JUNE 17, 1901. RENEWED DEC. 8, 1902.
NO MODEL. 8 SHEETS—SHEET 8.

WITNESSES.
Annie E. Perce.
Mabel Foster.

INVENTOR.
Joseph A. Turck
BY Warren R. Perce
ATTY.

UNITED STATES PATENT OFFICE.

JOSEPH A. TURCK, OF PROVIDENCE, RHODE ISLAND, ASSIGNOR TO MECHANICAL ACCOUNTANT COMPANY, OF SACO, MAINE, A CORPORATION OF MAINE.

CALCULATING-MACHINE.

SPECIFICATION forming part of Letters Patent No. 720,086, dated February 10, 1903.

Application filed June 17, 1901. Renewed December 8, 1902. Serial No. 134,437. (No model.)

*To all whom it may concern:*

Be it known that I, JOSEPH A. TURCK, a citizen of the United States, residing at Providence, in the county of Providence and State of Rhode Island, have invented certain new and useful Improvements in Calculating-Machines, of which the following is a specification, reference being had therein to the accompanying drawings.

Like numerals indicate like parts.

Figure 1:
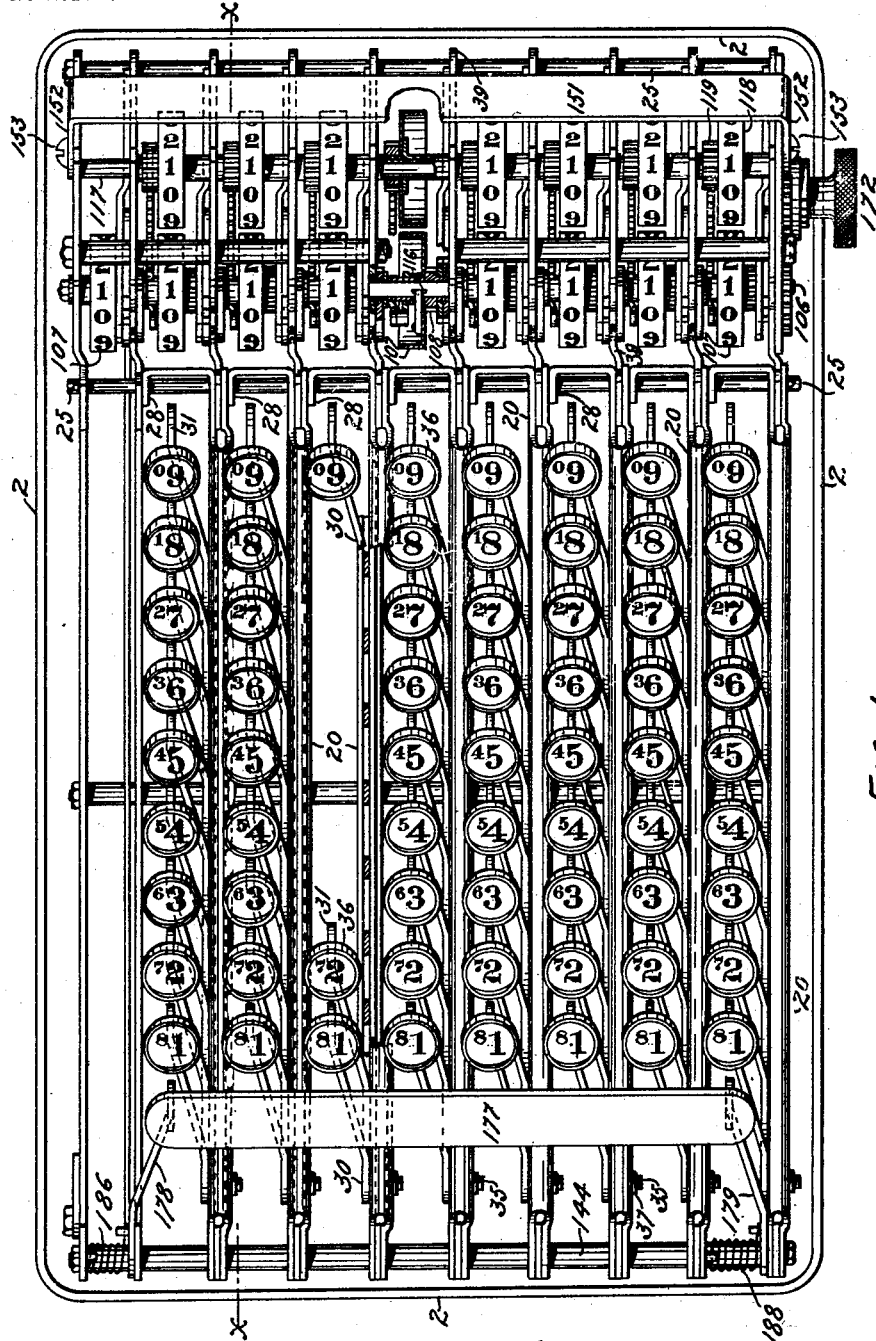
Figure 6:
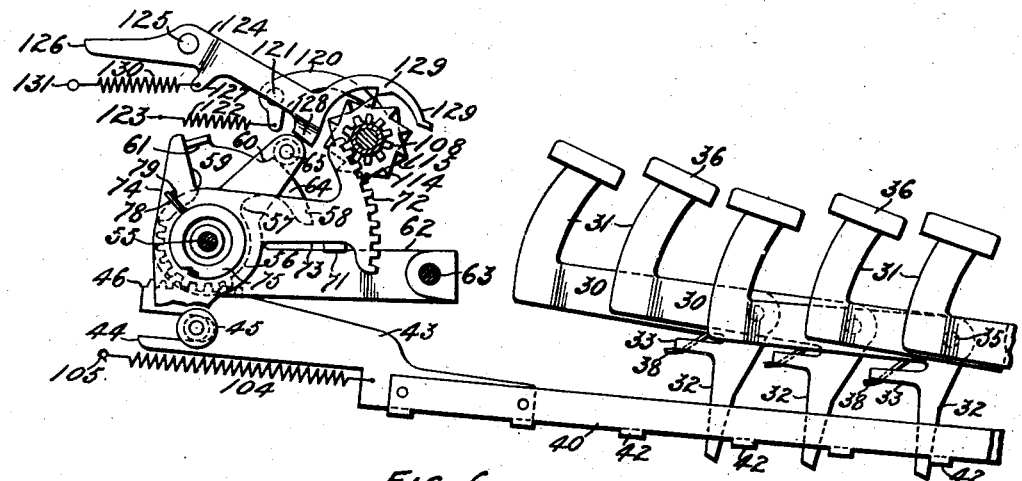
Figure 8:
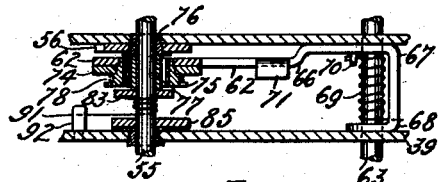
Figure 7:
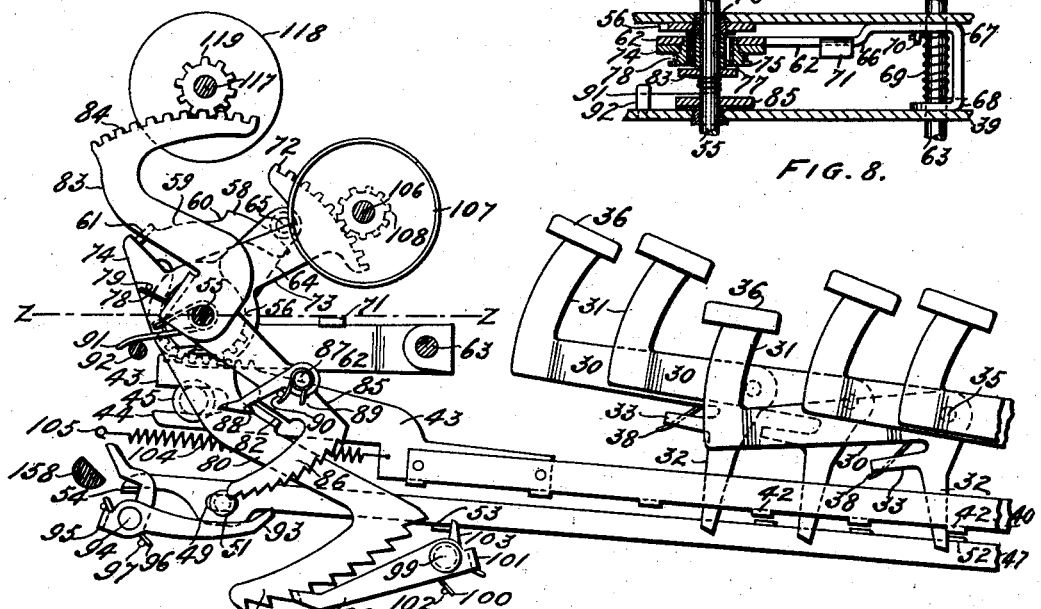
Figure 36:
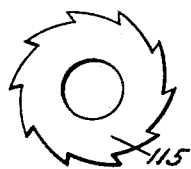
Figure 37:
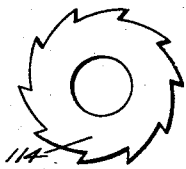
Figures 38, 39:
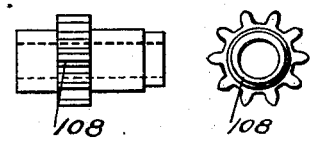
Figure 40:
Figure 41:
Figure 42:
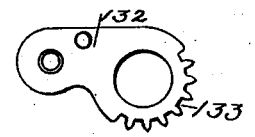
Figure 43:
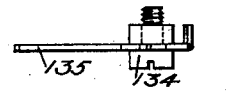
Figures 44, 45:
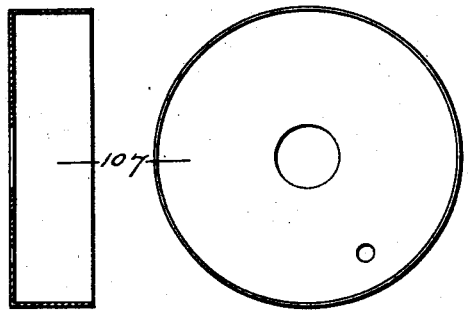
Figure 46:
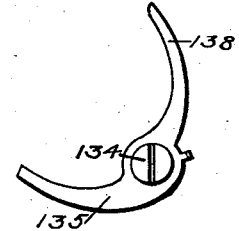

Figure 1 is a top plan of my improved calculating-machine. Fig. 2 is a view of the same, partly in side elevation and partly in vertical section, on line $x\ x$ of Fig. 1. Fig. 3 is a view of some of the parts of my said invention as seen partly in side elevation and partly in vertical section on line $x\ x$ of Fig. 1. Fig. 4 is a side elevation of one of the computing-dials. Fig. 5 is a perspective view of the same with its connected gears drawn on an enlarged scale. Fig. 6 is a side elevation of certain parts of my said device. Fig. 7 is a side elevation of the key mechanism computing-dial and key-register dial, together with the means of actuating said dials. Fig. 8 is a sectional view as seen on line $z\ z$ of Fig. 7. Fig. 9 is an elevation (on the right-hand side) of the units-computing dial and a portion of the mechanism for carrying the tenth unit over to the tens-computing dial. Fig. 10 is an elevation (on the left-hand side) of the units-computing dial and a portion of said carrying mechanism. Fig. 11 is a detail view, in side elevation, showing the ratchet-gears of one of the computing-dials, the two holding-pawls therefor, and the pawl of said carrying mechanism. Fig. 12 is a top plan of one of the key-bars and of the keys mounted thereon. Fig. 13 is an elevation (on the right-hand side) of the key-bar and keys, the carrying mechanism, and certain other parts of my said machine. Fig. 14 is a side elevation of the setback mechanism for returning all the dials to their zero-points. Fig. 15 is a side elevation of parts of said setback mechanism. Fig. 16 is a side elevation of the knob for actuating said setback mechanism. Fig. 17 is a diametrical section of said knob and the adjacent parts of the setback mechanism connected therewith. Fig. 18 is a side elevation of the case, showing the position of said knob. Fig. 19 is a side elevation of the setback-bar key and means actuated thereby to allow the setting back of the key-register dials. Fig. 20 is a perspective view of the key-bar for setting back the key-register dials. Fig. 21 is a plan view of the metallic strip from which the sliding or reciprocating bar is made. Fig. 22 is a sectional view of the bent-up sliding bar as seen on line $a\ a$ of Fig. 21. Fig. 23 is a sectional view of said bar as seen on line $b\ b$ of Fig. 21. Figs. 24 to 46, inclusive, are detail views.

My invention relates to machines for adding and other mathematical calculations; and it consists of the novel construction and combination of the several elements, as hereinafter particularly described, and specifically set forth in the claims.

In this specification the words "front" or "forward" will be used as indicating a direction toward the operator—that is, toward the front of the machine—and the words "rear," "back," or "backward" as indicating a direction away from the operator—that is, toward the back of the machine.

In the drawings the case is shown as consisting of several parts, 1 being a rectangular bottom piece open in the center and having on its four sides upwardly-turned flanges, as shown in Figs. 2 and 18, 2 the top, front, and rear piece, integral and having a central rectangular opening and resting by a lip 3 upon the edges of the flanges of the bottom piece 1, and 4 a key-plate perforated, as at 5, for the passage of the keys and inserted at its front edge beneath the upper flange of the top piece 2 and its rear edge abutting the lug 6 of one of the plates or frames hereinafter described. The rear portion of the top piece has a hood shape and is made with a narrow rectangular opening 7, extending nearly across the machine from side to side, within which the curved sight-plate 8 is secured, having an upper and lower series of sight-apertures 9 and 10. These pieces or portions of the case are preferably made of cast metal. A bottom plate 11, of wood or other suitable material, fills the aperture of the bottom piece 1.

At the front and rear are the cross-strips 12 and 13, having upwardly-turned ends 14 15 and secured to the bottom plate 11 and bottom piece 1 by screws 16 17. A rod 18 passes through holes made therefor in the turned-up ends 14 of the cross-strip 12 and extends across the front of the machine from side to side. A rod 19 passes through holes made therefor in the turned-up ends 15 of the cross-strip 13 and extends across the machine from side to side at the rear. (See Figs. 2 and 14.)

My improved calculating-machine has a series of key-bars 20, parallel with each other and extending from front to rear, as illustrated in Fig. 1. These key-bars are shown in Figs. 2 and 3, but are best illustrated in Figs. 1, 12, and 13. They are each made of a single strip of sheet metal bent into the shape of an inverted U. (See Fig. 3.) Each key-bar 20 has downwardly-extending ear-pieces 21 integral therewith and equidistant. On the left-hand downwardly-extending portion are equispaced holes 22, and registering with said holes 22 are holes 23 in the downwardly-extending earpieces 21, respectively. Each key-bar 20 is perforated near its ends for the passage therethrough of the rods 24 and 25. The rear end of the left-hand side of the key-bar 20 is bent twice at right angles, as shown at 26 and 27 in Fig. 12, with the end 28 extending to the front parallel with the bar 20. The forward end of the key-bar 20 has a downwardly-extending hanger 29 integral therewith, which is provided with a horizontal slot. (See Fig. 2.)

The keys 30 consist of a bar or strip of metal having a curved upwardly-extending arm 31 at the rear end and a downwardly-extending arm 32 at the front end. The upward-curved arms 31 of the keys 30 extend up through the perforations 5, respectively, of the key-plate 4. From the rear edge of the downward arm 32 there is a rearwardly-extending stop or arm 33, whose end is bent to underlie the key-bar 20. Each key 30 is vertically bent, as indicated at 34, Fig. 12. Near the downward bend of the key 30 a pivot 35 is riveted thereto, which rivet at its outer end is circumferentially grooved. On the upper end of the curved arm 31 is the key-head 36, with a numeral thereon to designate its denomination. The pivot 35, so secured to the key 30 by riveting, is inserted through the hole 22 of the key-bar 20 and through the hole 23 of the earpiece 21 of said bar 20, and an arc-shaped spring-ring 37 of about two hundred and seventy degrees in extent is snapped over the projecting end of the pivot 35 and sprung into the circumferential groove. This spring-ring 37 lies flat against the outer surface of the right-hand side of the key-bar 20, thus causing the key 30 near its pivoted end to lie in contact with the key-bar 20 and allowing the bent portion of the key 30 to project at an acute angle from the key-bar 20 toward the rear. A spring 38 is wound around the pivot 35 of each key 30 and has its forward end bearing up against the bent-over portion of the key-bar 20 and its rear end extended to bear up against the bent lip at the outer end of the stop-arm 33 of the key, as best shown in Fig. 13.

My improved calculating-machine consists of a series of sections extending from front to rear and parallel with each other. Each section has a frame or plate 39, the shape of which is best illustrated in Figs. 2 and 13. The frame or plate 39 supports the key-bar 20 and the operative parts of the device. The key-bar 20 is fastened to the frame or plate 39 by the rods 24 and 25.

A sliding or reciprocating bar 40 is made, preferably, of bent sheet metal. The metallic strip from which this sliding bar 40 is cut is illustrated in Fig. 21, where it is shown as having several rectangular openings or apertures, leaving intermediate integral cross-pieces. The strip thus formed is bent so as to be U-shaped in section where said cross-pieces are, as seen in Fig. 22, which is a sectional view on line $a\ a$ of Fig. 21, but with an open bottom between said cross-pieces, as seen in Fig. 23, which is a sectional view on line $b\ b$ of Fig. 21. This sliding bar 40 is provided near its front end with a pin 41, which enters the horizontal slot of the hanger 29. The pin serves to support the front end of the sliding bar 40. When said metallic strip has been bent as described, the integral U-shaped bends (see Fig. 22) constitute downwardly-projecting lugs 42, (see Figs. 2 and 3,) extending from the lower side of said sliding bar 40. The lower ends 32 of the keys 30 are inserted into said openings between the parallel sides of the sliding bar 40, Fig. 23, and are normally in contact with the rear edge of said lugs 42 of the sliding bar 40, as seen in Figs. 2 and 3. At its rear end the sliding bar 40 is riveted to the rack 43, whose front end enters between the bent sides of the bar 40 and is fastened therein by rivets, as shown, Fig. 3. The rack 43 has a horizontal slot 44 in its rear end. A friction-roller 45, properly mounted on the frame or plate 39, enters said slot 44 and serves to support the rear end of this compound sliding bar 40 43. The rack 43 is provided on its upper edge with the gear-teeth 46, as shown. Another sliding reciprocating bar 47 is mounted below and substantially parallel with the sliding bar 40 and is provided with slots 48 and 49 near its ends, as seen in Figs. 2, 3, and 7. Fixed pins 50 and 51 from the plate or frame 39 pass through these slots 48 and 49, respectively. This lower sliding bar 47 has lugs 52 on its upper edge properly spaced and arranged to receive the contact and pressure of the lower ends of the key-levers 30. Said sliding bar 47 also has a lug 53 on its lower edge and a bent lip 54 at its rear end.

Upon a flanged tubular bushing 76 is loosely mounted the segmental cam-gear 56, (see Fig. 8,) whose teeth engage with the teeth 46 of the rack 43. This cam-gear 56 has an integral radial arm 57, at the end of which are the arc-shaped extensions 58 and 59, respectively. The front arc-shaped extension 58 is of a larger radius than that of the rear arc-shaped extension 59, so that there is an intermediate cam edge or surface 60. The rear extension 59 has a bent lip 61, as shown in Figs. 2, 3, 6, 7, 13, and 29.

As oscillating bracket 62 is pivotally mounted on the rod 63. It is provided with an arm 64, projecting angularly upward in a forward direction, (Figs. 2, 3, 6, 7, 13, 27, and 28,) on the extremity of which arm is rotatably mounted a friction-roller 65, adapted to move on the cam edge or surface 60 and on the periphery of the front extension 58 of the segmental cam-gear 56. As seen in Figs. 8 and 27, the oscillating bracket-arm 62 is bent, as shown at 66, and is also bent twice at right angles, as shown at 67 and 68 in said figures. It is made with apertures, through which the rod 63 passes and a spiral spring 69, surrounding said rod, having one end underlying the bent end of the bracket-arm 62, and the other end bearing against the fixed pin 70 of the frame 39, as seen in Figs. 2 and 8, serves to keep the oscillating bracket 62 normally in the position shown in Figs. 2 and 3. At its rear end the oscillating bracket 62 has a circular aperture whose diameter exceeds the diameter of the shaft 55, and also has a bent lip or lug 71 on its upper edge, all as illustrated in Figs. 6 and 8. A segmental gear 72 is carried on the end of the upwardly-extending radial arm 73, integral therewith. (See Fig. 26.) The radial arm 73 also has an upwardly-extending arm 74 integral therewith, as shown, with which the lip 61 of the rear curved extension 59 of the radial arm 57 of the segmental cam-gear is adapted to contact. The radial arm 73 at its rear has a circular aperture whose diameter exceeds the diameter of the shaft 55, but is somewhat greater than the diameter of the circular aperture of the oscillating bracket 62, (see Fig. 8,) and a tubular bushing 75, having an annular flange and two circumferential shoulders, as shown in Figs. 8, 32, and 33, is riveted at its right-hand end to the oscillating bracket 62, by which means, as also by the circumferential shoulders of the bushing 75, the radial arm 73 is rotatable on said bushing 75.

A tube 77 surrounds the shaft 55, its right-hand end bearing against the flanged end of the bushing 76, as seen in Figs. 8, 30, 31, 34, and 35. The hole in the bushing 75 exceeds the diameter of the tube 77, as seen in Fig. 8. A coiled spring 78 surrounds the bushing 75 between the flange thereof and the adjacent surface of the radial arm 73. This spring has one end engaged in a notch in the flange of the bushing 75 and its other end bearing against a fixed pin 79 in the rear arm 74 of the oscillating bracket 62, as shown in Figs. 6 and 7.

Integral with the radial arm 73 is the downwardly-extending radial arm 80, which is slightly bent, as shown in Figs. 7 and 26, and has at its lower end the segmental ratchet 81. The segmental gear and the segmental ratchet 81 are concentric; but the latter has a longer radius than the former. On the radial arm 80 is a bent lip or lug 82, projecting therefrom at a right angle and having its end beveled, as shown. This integral piece, comprising the arms 73 80, gear 72, and ratchet 81, is shown in detail in Fig. 26. On the shaft 55 is also mounted rotatably an upwardly-extending radial arm 83, preferably curved, as shown in Figs. 7, 24, and 25, and having at its end the integral segmental gear 84. A downwardly-extending radial arm 85, integral with the arm 83 and parallel thereto, (being connected by a U-shaped bend,) has at its lower end the segmental ratchet 86. A stud or fixed pin 87 extends from the side of the radial arm 85, and a pawl 88 is mounted thereon, whose free end is engageable with the beveled lip or lug 82 of the radial arm 80, as shown in Figs. 7, 24, and 25, Figs. 24 and 25 showing said parts in detail and Fig. 25 being an end elevation of the same. A coiled spring 89 surrounds the stud 87 and has one end fastened to said pawl 88 and the other end bearing against the fixed pin 90, projecting from the radial arm 85. A coiled spring 91 surrounds the shaft 55 and has one end bearing on the edge of the U-shaped bend of the radial arm 85 and its other end bearing against the fixed pin 92, extending from the frame 39.

A pawl 93 is mounted on a stud 94 and has its front end engageable with the teeth of the segmental ratchet 86. As seen in Figs. 2, 3, and 7, said pawl 93 has a bend 95, and its rear end extends upward and is shaped as there drawn. A coiled spring 96, passing around the stud 94, has one end bearing against the bend 95 of the pawl 93 and its other end bearing against the fixed pin 97, extending from the frame or plate 39. The rear end 54 of the lower sliding bar 47 is bent and lies in contact with the rear upwardly-bent edge of the pawl 93, as seen in Figs. 2, 3, and 7.

A pawl 98 is pivotally mounted on the stud 99, which projects from the frame or plate 39, and has its rear end engageable with the teeth of the segmental ratchet 81. A coiled spring 100, wound around said stud 99, has one end lying under and bearing against a bent lip 101 of said pawl and its other end bearing against the fixed pin 102, extending from the frame or plate 39. A spur or projection 103, extending upward from the pawl 98, is engageable by the lug 53 of the lower sliding bar 47. A spiral spring 104, fastened at one end to the rack-bar 43, has its other end fastened to a fixed pin 105, extending from the frame or plate 39.

On a shaft 106, which extends through the machine from side to side, are loosely mounted the computing dials or wheels 107, (see Figs. 44, 45,) each having on its circumference the ten digital figures, as seen in Figs. 1 and 5. On each computing-dial 107, fastened to it and moving with it, is a pinion 108, (see Figs. 38 and 39,) meshing with the adjacent segmental gear 72. As seen in Figs. 4 and 5, each computing-dial 107 has on its left-hand side a centrally-mounted and fixed cam 109, having a volute-shaped edge and also a pawl 110, (see Figs. 40 and 41,) mounted on a stud 111 and pressed by a spring 112, which is fastened to a pin 113 and has its free end bearing against the pawl 110. Said computing-dial 107 has on its right-hand side not only the pinion 108, but also the two ratchet-gears 114 and 115, (see Figs. 36 and 37,) the teeth of the gear 114 being directed oppositely to the teeth of the gear 115. Said ratchet-gears and pinion all rotate with the dial 107, being fastened together. As seen in Fig. 1 at 116, the shaft 106 has slots or notches for the pawls 110 of the computing-dial 107, respectively, to engage with.

On a shaft 117, which extends through the machine from side to side, are loosely mounted the key-register dials or wheels 118, each having a pinion 119 attached thereto, which meshes with the segmental gear 84. Each key-register dial 118 has the ten digital figures on its circumference.

A pawl 120 is pivotally mounted on a stud 121, which extends from the frame or plate 39 and has its front end engageable with the ratchet-gear 115 and serves to prevent the backward rotation of said ratchet-gear and the computing-dial connected therewith. A spiral spring 122 is fastened to the rear end of the pawl 120 and to a fixed pin or lug 23, which extends from the plate or frame 39.

A pawl 124 is pivotally mounted on a stud 125, which extends from the plate or frame 39. Said pawl 124 has a rearward extension 126 and on its lower edge the two projections 127 and 128, as shown in Fig. 11. The forward end of the pawl 124 is curved upward in the arc of a circle and has a downwardly-projecting tooth 129. Said tooth 129 of the pawl 124 is engageable with the teeth of the ratchet-gear 114 of the computing-dial 107 and serves to prevent the overrotation of the ratchet-gear 114 and its connected computing-dial 107 in a forward direction. A spiral spring 130 extends from the projection 127 of the pawl 124 to a fixed pin or lug 131, which projects from the plate or frame 39. The projection 128 of the pawl 124 is adapted to contact with the upper end of the upward arm 64 of the oscillating bracket 62.

A rocker-arm 132, having an integral segmental gear 133, (see Figs. 9, 10, 11,) is mounted loosely on a tubular bushing (shown by a dotted circle in Fig. 10) which surrounds the shaft 106 and extends to the front. At its forward end it has pivotally connected at 134 a curved pawl 135 (see Figs. 43 and 45) at the center thereof, the lower (rear) end of which pawl is engageable with the ratchet-gear 115 of the computing-dial 107. (See Fig. 3.) A spring 136 is fastened to the curved plate 8, on the surface thereof, by a screw 137 (see Figs. 2 and 3) and extends over the upward extension 138 of the pawl 135. A presser or knob 139 is fastened to the spring 136, as shown. The forward terminal lip, Fig. 11, of the pawl 124 rides on the hub 134 of the pawl 135, Fig. 3.

A rocker-arm 140 is pivotally mounted on a stud 141, which projects from the plate or frame 39. It has a forward projection 142 and a segmental gear 143, which is engageable with the segmental gear 133 of the rocker-arm 132, Figs. 9 and 10. Said forward projection 142 has a friction-roller 145 mounted thereon, with which the edge of the cam 109 of the computing-dial 107 is in operative contact. The rocker-arm 140 at its pivoted end has the downward projection 146. A screw 147 passes loosely through an earpiece 148 of the plate or frame 39. A yoke 149, having a screw-threaded aperture, is engageable with the screw 147. A spiral spring 150 has one end attached to the yoke 149 and the opposite end attached to the projection 146 of the rocker-arm 140.

A bar or strip 151, Figs. 1, 14, and 15, extends across the machine from side to side. It has earpieces 152 at its ends, which are centrally pivoted on screws 153 and have their lower ends curved backward. This bar or strip 151 normally rests upon the rearward extensions 126 of all the pawls 114. A spiral spring 154 extends from the lower end of the earpiece 152 to a fixed pin 155, projecting from the frame or plate 391. This plate 391 constitutes a support for the working parts illustrated in Fig. 14 and is practically a part of the frame of the machine. A lever 156 is pivotally mounted at 157 to the frame or plate 391. A bar or shaft 158, plano-convex in cross-section, Figs. 2, 3, and 7, extends through the machine from side to side and is pivotally mounted at its ends, as shown at 159, Fig. 14. At the end of the shaft 158 is fastened a curved lever 160, whose upper end is in contact with the lower end of the lever 156. A spiral spring 161 extends from the lower end of the lever 160 to a fixed pin 162, projecting from the plate or frame 39. The normal position of the shaft 158 is illustrated in Figs. 2 and 3, in which it is seen that the rear edge of the upwardly-bent portion of the pawl 93 is nearly in contact with the plane surface of the shaft 158. An arm 163 projects angularly forward from the lever 156.

A short shaft 164 is properly mounted upon the plate 391. On the shaft 164 is an intermittent gear 165, having a suitable number of equispaced teeth and one wide tooth 166, having its periphery convex. A cam 167 is fastened to the side of the intermittent gear 165 and has a working edge, as shown in Figs. 14 and 15. On the side of the cam 167 is a pawl 168, pivotally mounted at one end. A spring 169, fastened to a pin 170 at one end, has its free end in contact with the pawl 168. A ratchet-gear 171 is also fastened on the side of the cam 168, and the free end of the pawl 168 is engageable with said ratchet-gear. The ratchet-gear 171 has two diametrically opposite slots in its outer side, as shown. A knob 172 is on the outside of the case, and its shank has two lugs 173, which engage with the diametrical slots in the side of the cam 167. By means of the screw 174 the hub 172 is secured to the shaft 164.

On the end of the shaft 106 is mounted the intermittent gear 175, having a suitable number of equispaced teeth and one wide tooth 176, whose periphery is concave. The gear 175 engages with the gear 165, as shown.

A key-bar 177 has bent arms 178 179 at its ends, which are pivotally mounted on the bushing or tube 144, which surrounds the rod 24, said rod passing through the machine from side to side. The arm 178 has a downward bend 180, Figs. 19 and 20. A bent lever 181 is pivotally mounted on a stud 182. On the left-hand end of the shaft 158, fastened at 183, is a curved arm 184, the end of which bears against the end of the long arm of the lever 181. A rod 185 connects the end of the bent end 180 of the arm 178 of the key-bar 177 with the end of the short arm of the bent lever 181. A spiral spring 186, surrounding the rod 144, has one end fastened to the rod 144 and the other end bearing against a pin 187, projecting from the arm 178. At the opposite end of the bushing 144 a spiral spring 188, surrounding said rod, has one end secured to the rod and the other end bearing against a pin 189, extending from the arm 179.

Having thus specified and described the parts of my said improved mechanism and their construction, I will now proceed to explain their operation.

It will be perceived by an examination of Fig. 2 that when the machine is not in operation the lower ends 32 of the keys 30 are respectively in contact with the adjacent lugs 42 of the sliding bar 40 and that said lugs 42 are equispaced, or substantially so, at a certain distance apart. The lugs 52 on the upper edge of the sliding bar 47 are not, however, equispaced, and the front lug 52 of the series is somewhat nearer the front of the machine than the front lug 42 of its series. The result of this arrangement is that the lower ends 32 of the keys 30 can move the lug 42 adjacent to it, and so slide the bar 40 to the front for some distance before said ends 32 of the keys 30 can come into contact with the lugs 52 of the sliding bar 47, and the position of each lug 52 is determined in such a manner that when its companion lug 42 of the sliding bar 40 has been moved by the end of the key 30 to such a distance as to enable the sliding bar 40 (by mechanism presently to be explained) to rotate the computing-dial to the extent intended for that key the said companion lug 42 will be in vertical alinement with the companion lug 52 of the sliding bar 47. Suppose, for the sake of explanation, that the seventh key of the series is operated, as illustrated in Fig. 7, by pressing on the key-head 36 of said key. The lower end 32 of that key 30 will first come in contact with and press the lug 42 adjacent thereto upon the lower edge of the sliding bar 40, whereupon the bar 40 will begin to slide to the front, being supported at its front end by its pin 41 in the horizontal slot of the hanger 29 and its connected rack-bar 43 being supported at its rear by its friction-roller 45 in the horizontal slot 44 in the end of said rack-bar. The first effect of this movement of the sliding bar 40 and its connected rack-bar 43 is that the gear-teeth 46 on the rack-bar 43, engaging with the teeth of the segmental cam-gear 56, will slightly move said cam-gear and the friction-roller 65 will move from its normal position on the rear curved extension 59 of the cam-gear 56 (shown in Fig. 3) up the intermediate cam-surface 60 of said gear and onto the front curved extension 58 of said gear to the position shown in Fig. 6. The oscillating bracket 62, on the end of the upward arm 64 of which said friction-roller 65 is mounted, is by this movement of the roller 65 (up and over the cam-surface 60 of the cam-gear 56) slightly elevated, and the immediate result of this rise of the oscillating arm 62 is that the segmental gear 72 of the radial arm 73 is moved from the position shown in Fig. 2 (where said gear 72 is separated from and disengaged from the pinion 108 of the computing-dial 107) into the position shown in Fig. 6, (where the segmental gear 72 is shown in engagement with the pinion 108 of the computing-dial 107.) This upward oscillation of the bracket 62, however, does not affect the position of the other parts of the device which are mounted on the shaft 55, because the diameter of the bore of the tubular bushing 76 is so much greater than that of the tube 77, surrounding said shaft 55, as will be readily understood upon an inspection of Figs. 6 and 8. The continuing pressure of the operator's finger upon the key-head 36 of said key 30 causes the sliding bar 40 and its connected rack-bar 43 to slide still more to the front, whereupon the rack-gear teeth 46 move the teeth of the segmental cam-gear 56, thereby carrying backward the bent lip 61 of the rear curved extension 59 integral with said segmental gear. The lip 61 therefore presses the rear upward arm 74 of the radial arm 73 of the segmental gear 72, thereby moving the segmental gear 72 from the position shown in Fig. 6 in the direction indicated in Fig. 7. By reason of the engagement of the segmental gear 72 with the pinion 108 of the computing-dial 107 it is seen that said computing-dial 107 is partially rotated to the extent of the throw of the segmental gear 72 until the travel of the segmental gear 72 is limited, as will now be described. As the radial arms 73 and 80, the segmental gear 72, the segmental ratchet 81, and rear upward arm 74 are all integral, being in one piece, (see Fig. 26,) they all move together by the pressure of the bent lip 61 against the rear upward arm 74. As soon as the lower end 32 of said depressed key comes in contact with the lug 52 of the lower sliding bar 47, as illustrated in Fig. 7, the continuing pressure of the operator's finger upon the key-head 36 of said key causes the lower sliding bar 47 also to move to the front, whereupon the lug 53 of the sliding bar 47 in contact with the spur 103 of the pawl 98 causes the free end of said pawl 98 to rise and engage the seventh tooth of the segmental ratchet 81, thus preventing any further movement of the ratchet 81, radial arms 80 74 73, and segmental gear 72. The computing-dial 107 will in this manner be stopped in its rotation, and the digit "7" on the periphery of the dial 107 will be visible through the sight-aperture 10 of the curved plate 8. The pawl 120, engaging with the ratchet 115 of the dial 107, (see Figs. 3, 6, and 11,) prevents any reverse rotation of the dial 107, and the pawl 124, engaging with the ratchet 114 of the dial 107, prevents any forward or over rotation of the dial 107, as will presently be explained. The forward movement of the radial arm 80, caused as already explained, brings the lug or lip 82 of said arm into contact with the rear edge of the radial arm 85, and thereby moves said arm 85 in the same direction. As the segmental ratchet 86, radial arms 85 83, and segmental gear 84 all move together, being in one piece, (see Figs. 24 and 25,) the pushing of the radial arm 85 by the lug or lip 82 of the radial arm 80 results in the movement of the segmental gear 84 from the position shown in Fig. 2 to the position shown in Fig. 7, and as the segmental gear 84 engages with the pinion 119 of the key-register dial 118 the dial 118 is moved accordingly until it is stopped by the engagement of the pawl 98 with the segmental ratchet 81. The result of these movements is that the digit "7" on the periphery of the dial 118 is visible through the sight-aperture 9 of the curved plate 8. The free end of the pawl 93 is normally in contact with the segmental ratchet 86 by the force of the spring 96; but said pawls 93 and 98 are so placed and the action is so timed that the pawl 93 is in contact with the segmental ratchet 86 only when the pawl 98 is out of engagement with the segmental ratchet 81 and the pawl 93 is out of engagement with the segmental ratchet 86 only when the pawl 98 is in engagement with the segmental ratchet 81. (Compare Figs. 2 and 7.) Hence at the instant the pawl 98 is beginning to engage with the ratchet 81, as in Fig. 7, the pawl 93 is disengaged from the ratchet 86. This disengagement of the pawl 93 from the ratchet 86 at this time is due to the fact that at the very end of the forward movement of the sliding bar 47 its bent lip 54, then coming in contact with the rear upward end of the pawl 93, causes the pawl 93 to turn on its pivot 94, so that the free end of the pawl 93 assumes the position shown in Fig. 7. Suppose the next figure of the problem for addition is "2." The operator lifts his finger from the key-head 36 of the seventh key, whereupon by force of the spring 38, now free to act, bearing up against the arm 33 of said key, said seventh key of the series is moved from the position shown in Fig. 7 to the position shown in Figs. 2 and 3. The pawl 98, being now free to act, is moved downward by the force of the spring 100 and pushing backward against the lug 53 of the lower sliding bar 47 slides said bar 47 backward from the position shown in Fig. 7 to the position shown in Fig. 2. The instant the bar 47 begins to slide backward the bent lip 54 of said bar disengages from the upward arm of the pawl 93 and said pawl by the force of the spring 96, then free to act, immediately engages the segmental ratchet 86 with the seventh tooth thereof, so that the key-register dial 118 continues to display the digit "7" of its periphery through the sight-aperture 9 of the curved plate 8. As soon as the pressure of the lower end 32 of the seventh key against the lug 42 of the upper sliding bar 40 is relieved by the raising of the operator's finger from the head 36 of said key the sliding bar 40 is free to move to the rear, being actuated in that direction by the spring 104. This rearward movement of the sliding bar 40 carries backward the rack-bar 43, connected therewith, and by the engagement of the gear-teeth 46 of said rack-bar with the segmental cam-gear 56 causes a partial rotation of said segmental cam-gear from the position shown in Fig. 7 to the position shown in Fig. 6. During this movement, however, the segmental gear 72 does not move at all, because the periphery of the forward extension 58 of the radial arm 57 of said cam-gear 56 is in the arc of a true circle. Therefore the movement of said curved extension 58 simply rotates the friction-roller 65 of the arm 64; but as soon as the parts are in the position shown in Fig. 6 and the friction-roller 65 runs down the intermediate cam-surface 60 to the rear curved extension 59 of the radial arm 57 (said curved extension 59 being of a less radius than that of the curved extension 58) and the arm 64 of the oscillating bracket 62 descends by reason of its friction-roller 65 passing down on said intermediate cam-surface 60, and as said arm 64 is integral with the oscillating bracket 62, said bracket 62, pivoted at 63, descends by force of the spring 69, then free to act, from the position shown in Figs. 6 and 7 to the position shown in Figs. 2 and 3. This descent of the oscillating bracket 62 is possible because the bore of the bushing 75 is greater than the diameter of the tube 77, as already explained, and is also possible because the reverse rotation of the segmental cam-gear 56 has moved the bent lip 61 of the rear extension 59 of the radial arm of said cam-gear 56 toward the front out of contact with the rear upward arm 74 of the radial arm 73, as shown in Fig. 2. The descent of the oscillating bracket 62, as described, causes the disengagement of the segmental gear 72 from the pinion 108 of the dial 107. The lug or bent lip 71 on the upper side of the bracket 62 is for the purpose of limiting the downward movement of the radial arm 73 of the segmental gear 72, as will be readily understood by examining Fig. 2. This descent of the bracket 62 and its connected upward arm 64 also results in the descent of the pawl 124 and its engagement with the ratchet-gear 114 of the dial 107, thereby preventing overrotation of said dial in a forward direction. As the lower projection 128 of said pawl 124 rests or rides upon the upper end of the arm 64, it is evident that the rise of said arm 64 when the bracket oscillates upward lifts the pawl 124 out of engagement with the ratchet-gear 114 and that the descent of the arm 64 when the bracket 62 oscillates downward causes the pawl 124 to fall into engagement with the ratchet-gear 114. All these movements of the machine take place as soon as the operator has removed his finger from the key-head 36 of the seventh key of the series. The computing-dial 107 being locked in position from either forward or backward rotation shows its digit "7" through the sight-aperture 10, and the key-register dial 118 being locked in position by the engagement of the pawl 93 with the seventh tooth of the segmental ratchet 86 shows its digit "7" through the sight-aperture 9, thus informing the operator that the last key he struck was that one marked "7" on its key-head. The operator desiring next to add two, as already supposed, then presses that key-head 36 which is marked "2." The depression of this key causes the pressure of its downward end 32 against the lug 42 of the sliding bar 40, thus moving the rack-bar 43. This movement rotates the gear 56, causes the friction-roller 65 to run up the intermediate surface 60 of the cam, and so throws the gear 72 into mesh with the pinion 108 and rotates said pinion the space of two teeth and correspondingly rotates the computing-dial 107 in the same manner as before explained. The result is that the computing-dial, which before read "7" through the sight-aperture, now has been rotated two-tenths of a revolution and reads "9" through said sight-aperture— 7+2=9. The addition has now been performed. The gear 72 cannot move forward any farther, because by this time the lower end 32 of the second key has come into contact and pressure against the lug 52 of the lower sliding bar 47 and the pawl 98 has risen to engage the second tooth of the ratchet-gear 81 in the same manner as before described; but as the pawl 93 is always disengaged from the segmental ratchet 86 whenever the pawl 98 is in engagement with the segmental ratchet 81 the spring 91 is now free to act and the segmental gear 84 rotates the pinion 117 of the key-register dial 118 until the lower radial arm 85 comes in contact with the bent lip 82, whereupon the pawl 93 engages with the second tooth of the segmental ratchet 86, and consequently the key-register dial which before read "7" through the sight-aperture 9 now reads "2" through said aperture and informs the operator that the key which he last struck is that marked "2." The computing-dial now reads "9" and the register-dial now reads "2." Suppose the next number of the problem to be added is "4." When the operator lifts his finger from the head 36 of the second key which he has been depressing, the sliding bars 40 and 47 move to the rear, as already explained, the segmental cam-gear 56 returns to its normal position, the gear 72 disengages from the pinion 108 of the computing-dial 107 by the descent of the oscillating bracket 62, all as before stated, whereupon the segmental ratchet 81 returns to its original position; but the pawl 93 and segmental ratchet 86 remain engaged, as above described. The operator then depresses the key-head marked "4," and this movement results, as has been fully described, in rotating the computing-dial four spaces— 9+4=13; but as there are only ten digits and spaces on the periphery of the dial 107 the figure "3" appears displayed through the sight-aperture 10, the "1" being carried over to the next computing-dial 107 to the left. As soon as the segmental ratchet-gear 81 has moved two spaces the continued movement of the radial arm 80 thereof allows the radial arm 85 to follow until the pawl 93 engages with the fourth tooth of the segmental ratchet-gear 86, and the figure "4" of the key-register dial 118 is seen through the sight-aperture 9, indicating that the key-head marked "4" was the last one struck. This carrying over of the tenth unit to the "tens-wheel" will be now explained. As seen in Figs. 4 and 5, the computing-dial 107 has a volute-shaped cam 109, which moves with it and whose greatest radius is just in advance of the numeral "9" upon the periphery of the dial. In Fig. 9 this cam 109 is seen in contact with the friction-roll 145 of the forward extension of the rocker-arm 140. As the dial 107 rotates the edge of the cam 109 gradually depresses the rocker-arm 140. As the rocker-arm 140 descends its connected segmental gear 143, descending with it, partially rotates the segmental gear 133 of the oscillating arm 132, moving said arm from the position shown in dotted lines in Fig. 10 to the position shown in solid lines in said figure. It is shown in Fig. 11 that the carrying-pawl 135 is pivotally mounted at 134 to the end of the rocker-arm 132. When the cam 109 has reached the extreme limit of its throw and the end of the arm 132 is thereby elevated to its extreme limit, as in Fig. 10, the further rotation of the cam 109 causes its point to slip past the friction-roller 145, whereupon by force of the spring 150 the arm 140 returns to its normal position. This gradual rise of the arm 132 has caused the carrying-pawl 135 gradually to retract until when the dial 107 has reached the position where its numeral "9" is seen through the sight-aperture 10 said pawl 135 has slipped over one tooth of the ratchet of the ratchet-gear 115 of the next computing-dial 107 at the left hand. Then the arm 132, moving from the position shown in solid lines in Fig. 10 to the position shown in Fig. 11, causes the pawl 135 to push the ratchet-gear 115 of such adjacent dial 107 one space by the force of the spring 150. The result of this movement is that the adjacent dial 107 then shows the numeral "1" of its periphery through the sight-aperture 10 of the series next to the left of the series where the operator is working. The tension of the spring 150 is regulated by means of the screw 147, earpiece 148, and yoke 149, as shown in Figs. 9 and 10. If, however, it is desired that the carrying-pawl 135 shall be inoperative and not carry the tens to the adjacent computing-dial on the left, it is moved out of engagement with the ratchet-gear 115 of said dial by the pressure of the operator's finger upon the knob 139 of the spring 136, Fig. 3. The end of the spring 136 while so pressed moves inwardly the curved upper end 138 of the pawl 135 and so disengages the end of the pawl 135 from said ratchet 115. It is necessary to thus press the knob 139 whenever the machine is used for subtraction, and in this case the smaller numerals on the key-heads 36, as in Figs. 1 and 12, indicate which key is to be struck. When the pressure upon the knob 139 ceases, the spring 136 rises automatically and frees the end 138 of the pawl 135.

The set-back mechanism will be now explained. For setting back the key-register dials 118 alone to their zero-points the key-bar 177 is depressed, which results in drawing the rod 185 and rocking the bent lever 181. (See Figs. 19 and 20.) The rock-shaft 158, Figs. 2, 3, and 13, has at one end the curved arm 184, Fig. 19, in contact with the rear end of the bent lever 181, so that the depression of the key-bar 177 results in a partial rotation of the rock-shaft 158, to which said curved arm 184 is fastened. By an examination of Figs. 2 and 3 it is seen that the partial rotation of the rock-shaft 158 so caused brings the flat surface of said rock-shaft against the bent-up rear end of the pawl 93 and presses said pawl out of engagement with the segmental ratchet-gear 86, whereupon the spring 91, being now free to act, causes the segmental gear 84 to rotate the pinion 119 of the register-dial 118 to its zero or starting position, as illustrated in Fig. 2. All the register-dials 118 of the machine are thus set back to the zero-point by the one depression of the key-bar 177.

All the computing-dials 107 and all the key-register dials 118 of the machine can be set back to their zero or starting positions by one movement, as follows: The knob 172, projecting from the right-hand end of the machine, (see Fig. 18,) is turned by the operator in the direction of the movement of the hands of a clock. The lugs 173 of the shank of said knob 172 engage with the diametrical slots of the ratchet-gear 171 and cause said ratchet-gear to rotate on the shaft 164, Figs. 14, 15, and 17. As the pawl 168, mounted on the concentric cam 167, is engaged with said ratchet-gear 171, the rotation of the knob 172 causes a like rotation of the cam 167, said pawl 168 being held in such engagement by means of the spring 169. The working edge of the cam 167 in operative contact with the end of the arm 163 of the lever 156 causes said lever to move its upper end forward and its lower end backward. The forward movement of the upper end of the lever 156 moves the earpiece 152, which, being pivoted at 153 and fastened to the end of the bar 151, causes the bar 151 to descend and depress the rear ends 126 of the pawl 124, thus lifting the projections or teeth 129 of said pawls 124 out of engagement with the teeth of the ratchet-gears 114 of the computing-dials 107, which dials are thus free to rotate reversely. (See Fig. 2.) The rearward movement of the lower end of the lever 156 causes the rocking of the curved arm 160, Fig. 14, thus rocking the rock-shaft 158, with the result, already explained, of causing the key-register dials to rotate back to their zero or starting position. As the cam 167 is fastened to the intermittent gear 165, said gear rotates therewith. The wide tooth 166 of the gear 165, however, at first merely slides upon the wide tooth 176 of the intermittent gear 175 without imparting any movement thereto; but as soon as the narrow teeth of said gears 165 and 175 are in mesh the rotation of the knob 172 results in the partial rotation of the gear 175. The gear 175 is fastened on the shaft 106, whereon all the computing-dials 107 are loosely mounted, and therefore rotates said shaft, as shown in Fig. 1. The shaft 106 has for each dial 107 a notch 116, with which the pawl 110 of each dial 107 is engageable, as is evident in Figs. 1 and 4, being forced in such engagement by the spring 112. As soon as the pawl 110 of the dial 107 is thus engaged in the notch 116 of the shaft 106 the reverse rotation of the shaft 106, caused, as described, by the turning of the knob 172, results in the setting back of all the computing-dials 107 to their zero or starting positions. These movements are so timed that while the convex wide tooth 166 of the intermittent gear 165 is sliding on the concave wide tooth 176 of the intermittent gear 175 (and therefore the gear 165 is not then turning the gear 175) the cam 167 and the parts which it is operating cause the disengagement of all the holding-pawls 124 from the ratchet-gears 114 of all the computing-dials 107 and also the return of all the key-register dials 118 to their zero or starting positions before the computing-dials 107 begin their reverse rotation; but as soon as the wide tooth 166 of the gear 165 has passed the wide tooth 176 of the gear 175 the other teeth of the gear 165, engaging with the other teeth of the gear 175, cause the rotation of the shaft 106, and with it the rotation of the computing-dials 107 thereon, whenever the pawls 110 thereof have engaged with the slots 116 of the shaft 106, as already described.

The action of the various springs is as follows: The springs 38 return the keys 30 when relieved of the pressure of the operator's finger, Fig. 7. The spring 69 automatically depresses the oscillating bracket 62, Figs. 2 and 8. The spring 78 gives reverse movement to the segmental gear 72 73, Figs. 6 and 7. The spring 89 keeps the pawl 88 in its normal position, Figs. 2 and 7. The spring 91 moves the arm 83 and segmental gear 84, Figs. 2 and 7. The spring 96 normally elevates the pawl 93, Figs. 2 and 3. The spring 100 normally depresses the pawl 98, Fig. 2. The spring 104 gives the backward movement to the sliding bar 40 and its connected rack-bar 43 and the segmental cam-gear 56, Fig. 3. The spring 112 presses the pawl 110 of the computing-dial 107, Fig. 4. The spring 122 depresses the pawl 120, Figs. 3 and 11. The spring 130 depresses the pawl 124, Figs. 3 and 11. The spring 150 gives the return motion to the rocker-arm 140, Figs. 9 and 10. The spring 154 keeps the earpiece 152 of the rocker-bar 151 in an elevated position, Fig. 14. The spring 161 keeps the curved arm 160 of the rock-shaft 158 in its normal position, Fig. 14. The spring 169 presses the pawl 168 into engagement with the ratchet-gear 171, Fig. 14. The springs 186 and 188 normally elevate the key-bar 177, Figs. 19 and 20.

In order to prevent overrotation of the key-register mechanism, the pawl 88, pivoted at 87 to the lower radial arm 85, engages by its beveled head the beveled lug or lip 82 of the lower radial arm 80 of the segmental ratchet 81.

The extensions of the key-bars 20, each bent at right angles, as shown at 26 and 27 in Fig. 12, impart great strength to the structure when they are assembled as shown in Fig. 1. The bent end 28 of each key-bar 20 extends in contact with the right-hand surface of the next adjacent key-bar 20 on the left, thus maintaining the parallelism of the several key-bars. A slightly-bent projection of the plate or frame 39 enters the U-shaped bend of the key-bar 20 at its rear end, as seen in Fig. 12. The key-bars are perforated at their forward ends for the passage of the rod 24 through them, and said key-bars, as also their bent ends 28, are perforated for the passage of the rod 25 through them, as is shown in Figs. 1 and 13. In this manner the key-bars 20 and the keys 30, connected therewith, are detachable and are easily removed and replaced for repairing or other purposes.

By making the reciprocating bar 40 as shown in Figs. 21, 22, and 23 it is evident that the downward projection 32 of each key-lever 30 is supported against lateral pressure or movement, because it passes between the two parallel strips which constitute said reciprocating bar, as also through the aperture between the adjacent cross-pieces or lugs 42, and consequently the said key end 32 is guided into proper contact with the lug 42, because said key end is thus confined to a movement in its own vertical plane.

I claim as a novel and useful invention and desire to secure by Letters Patent—

1. In a calculating-machine, the combination of a key-bar and a plurality of key-levers, each having a head at one end and each having an intermediate angular bend and pivotally mounted on the key-bar so that the pivoted ends of said key-levers, respectively, are parallel with and in contact with the key-bar, but their free ends, respectively, are parallel with each other and extend angularly from the key-bar, substantially as shown.

2. In a calculating-machine, the combination of a plurality of key-bars each perforated at its ends and each having one end bent twice at right angles to form a returning end which is perforated and is in contact with the adjacent key-bar, a plurality of perforated plates or frames each adapted to support its adjacent key-bar, a rod passing through the perforations of said plates, key-bars and return-bends at one end thereof, a rod passing through the perforations of said plates and key-bars at the opposite ends thereof and means to confine said rods in position, substantially as described.

3. In a calculating-machine, the combination of a key-bar, a sliding reciprocating bar mounted on proper supports and comprising two parallel strips open on the top and provided with cross-pieces at intervals on the bottom thereof leaving apertures between said cross-pieces, key-levers pivotally mounted on said key-bar and having downwardly-extending ends which pass between said two parallel strips of the reciprocating bar and through said apertures, respectively, and adapted each to contact with the adjacent cross-piece of said reciprocating bar, a computing-dial properly mounted, and means operative by said reciprocating bar and adapted to give a rotary movement to said computing-dial, substantially as specified.

4. In a calculating-machine, the combination of a shaft, a computing-dial rotatably mounted on said shaft, a key-lever pivotally mounted on a proper support and having a downwardly-extending end, a spring adapted to give a return movement to the key-lever, a spring-pressed reciprocating bar having a lug with which said end of the key-lever is adapted to contact, a rack-bar in continuation of said reciprocating bar, a segmental gear mounted upon a proper support and engageable with said rack-bar and means between said segmental gear and computing-dial adapted to impart a rotary movement to said computing-dial, substantially as specified.

5. In a calculating-machine, the combination of a shaft, a computing-dial rotatably mounted upon said shaft and having a concentric pinion, a key-lever pivotally mounted on a proper support and having a downwardly-extending end, a spring adapted to give a return movement to the key-lever, a spring-pressed reciprocating bar having a lug with which said end of the key-lever is adapted to contact, a rack-bar in continuation of said reciprocating bar, a segmental cam-gear mounted on a proper support and engageable with the rack-bar, a gear engageable with said pinion of the computing-dial and mounted upon a support which is adapted to rise and descend by its contact with the cam-surface of said segmental gear, substantially as described.

6. In a calculating-machine, the combination of a shaft, a computing-dial rotatably mounted upon said shaft and having a concentric pinion, a spring-pressed key-lever pivotally mounted on a proper support and having a downwardly-extending end, a spring-pressed reciprocating bar having a lug with which said end of the key-lever is adapted to contact, a rack-bar in continuation of said reciprocating bar, a segmental gear engageable with said rack-bar and mounted on a proper support and having a cam thereon, a gear engageable with said pinion and mounted on an oscillating arm adapted to rise by its contact with said cam for the purpose of engaging the last-named gear with said pinion, and a spring arranged to depress said oscillating arm for the purpose of disengaging the said last-named gear from said pinion, substantially as shown.

7. In a calculating-machine, the combination of a shaft, a computing-dial rotatably mounted upon said shaft and having a concentric pinion, a spring-pressed key-lever pivotally mounted on a proper support and having a downwardly-extending end, a spring-pressed reciprocating bar having a lug with which said end of the key-lever is adapted to contact, a rack-bar in continuation of said reciprocating bar, an oscillating segmental gear engageable with said rack-bar and mounted on a proper support and having a cam thereon and also having a bent lip extending therefrom, an oscillating arm pivotally mounted on a support and having a projection with which said bent lip of the segmental gear is adapted to contact, a spring arranged to give a downward movement to said oscillating arm and a gear mounted on said oscillating arm and movable thereby into and out of engagement with said pinion, substantially as specified.

8. In a calculating-machine, the combination of a shaft, a key-register dial rotatably mounted on said shaft, a series of key-levers each of which is pivotally mounted on a proper support and has a downwardly-projecting end, a reciprocating bar having a series of lugs with which respectively the said key-levers respectively are adapted to contact, means actuated by said reciprocating bar and adapted to impart a rotary movement to the key-register dial, and means adapted to give a return movement to said key-register dial as far as limited and permitted by said key-levers, respectively, whereby the key-register dial is adapted to indicate which key-lever of said series was last operated, substantially as described.

9. In a calculating-machine, the combination of a shaft, a key-register dial rotatably mounted on said shaft, a spring-pressed key-lever pivotally mounted on a proper support and having a rack and also a downwardly-projecting end, a reciprocating bar having a lug with which said end of the key-lever is adapted to contact, an oscillating arm pivotally mounted on a proper support and having a segmental gear, engageable with said rack, and means between said arm and key-register dial adapted to impart a rotary movement to the key-register dial, substantially as described.

10. In a calculating-machine, the combination of a shaft, a key-register dial rotatably mounted on said shaft, a spring-pressed key-lever pivotally mounted on a proper support and having a rack and also a downwardly-projecting end, a reciprocating bar having a lug with which said end of the key-lever is adapted to contact, an oscillating arm pivotally mounted on a proper support and having a segmental gear engageable with said rack, means between said arm and key-register dial adapted to impart a rotary movement to the key-register dial in one direction, and means adapted to give a reverse movement to said key-register dial, substantially as shown.

11. In a calculating-machine, the combination of a shaft, a computing-dial rotatably mounted on said shaft, a second shaft, a key-register dial rotatably mounted on said second shaft, a key-lever pivotally mounted upon a proper support and having a downwardly-extending end, a reciprocating bar having a lug with which said end of the key is adapted to contact, means actuated by said reciprocating bar and adapted to impart a rotary movement to said computing-dial, a spring arranged to give a return movement to said key-lever, a spring adapted to give a return movement to said reciprocating bar, means actuated by said reciprocating bar and adapted to impart a rotary movement to said key-register dial in one direction, and means adapted to give a return movement to said key-register dial, substantially as set forth.

12. In a calculating-machine, the combination of a shaft, a computing-dial rotatably mounted on said shaft, a second shaft, a key-register dial rotatably mounted on said second shaft, a spring-pressed key-lever pivotally mounted on a proper support and having a downwardly-extending end, a spring-pressed reciprocating bar having a lug with which said end of the key-lever is adapted to contact, a rack-bar in continuation of said reciprocating bar, a segmental gear mounted upon a proper support and engageable with said rack-bar, means between said segmental gear and computing-dial adapted to rotate said computing-dial, an arm pivotally mounted on a proper support and movable by said reciprocating bar, and means between said arm and key-register dial adapted to impart a rotary movement to the key-register dial, substantially as shown.

13. In a calculating-machine, the combination of a shaft, a computing-dial rotatably mounted on said shaft and having a concentric pinion, a second shaft, a key-register dial rotatably mounted on said second shaft and having a concentric pinion, a spring-pressed key-lever pivotally mounted on a proper support and having a downwardly-extending end, a spring-pressed reciprocating bar having a lug with which said end of the key-lever is adapted to contact, a rack-bar in continuation of said reciprocating bar, a segmental cam-gear mounted upon a proper support and engageable with said rack-bar, a gear engageable with the pinion of the computing-dial and mounted upon an oscillating arm which is adapted to rise and descend by its contact with the cam-surface of said segmental gear, an arm pivotally mounted on said oscillating arm, and movable by said reciprocating bar and provided with a bent lip extending therefrom, a lever-arm centrally pivoted upon a proper support, the lower end of which lever-arm is adapted to contact with said bent lip, a segmental gear upon the upper end of said lever-arm engageable with the pinion of the key-register dial, and a spring arranged to give return movement to said lever-arm, substantially as described.

14. In a calculating-machine, the combination of a shaft, a computing-dial rotatably mounted on said shaft and having a concentric pinion, a second shaft, a key-register dial rotatably mounted on said second shaft and having a concentric pinion, a spring-pressed key-lever pivotally mounted on a proper support and having a downwardly-extending end, a spring-pressed reciprocating bar having a lug with which said end of the key-lever is adapted to contact, a rack-bar in continuation of said reciprocating bar, an oscillating segmental gear engageable with said rack-bar and mounted on a shaft and having a cam thereon and also having a bent lip extending therefrom, an oscillating arm pivotally mounted on a support and having a tubular bushing through which the shaft of said segmental gear passes, the diameter of the bore of which bushing considerably exceeds the diameter of the last-named shaft, an arm projecting from said oscillating arm and adapted to receive pressure from the bent lip of said segmental cam-gear, a spring arranged to give downward movement to said oscillating arm, a lever-arm centrally fastened on said bushing and movable with said oscillating arm, a segmental gear upon the upper end of said lever-arm engageable with the pinion of the computing-dial, a bent lip projecting from the lower part of said lever-arm, a second lever-arm centrally mounted on the shaft of said segmental cam-gear, the lower end of which second lever-arm is adapted to contact with the bent lip of said first lever-arm and the upper end of which second lever-arm is provided with a segmental gear engageable with the pinion of the key-register dial, and a spring arranged to give return movement to said second lever-arm, substantially as specified.

15. In a calculating-machine, the combination of a shaft, a key-register dial rotatably mounted on said shaft, a key-lever pivotally mounted on a proper support and having a downwardly-projecting end, a reciprocating bar having a lug with which said end of the key-lever is adapted to contact, an arm pivotally mounted on a proper support and movable by said reciprocating bar, a second reciprocating bar having a lug with which said end of the key-lever is adapted to contact, a segmental ratchet at the lower end of said arm, means between said arm and key-register dial adapted to impart a rotary movement to the key-register dial, and a spring-pressed pawl engageable with said segmental ratchet and movable by the second-named reciprocating bar into engagement with said segmental ratchet, substantially as shown.

16. In a calculating-machine, the combination of a shaft, a key-register dial rotatably mounted on said shaft and having a concentric pinion, a spring-pressed key-lever pivotally mounted on a proper support and having a downwardly-projecting end, a reciprocating bar having a lug with which said end of the key-lever is adapted to contact, a lever-arm pivotally mounted on a proper support and movable by said reciprocating bar and provided with a bent lip extending therefrom, a segmental ratchet at the lower end of said arm, a second reciprocating bar having a lug with which said end of the key-lever is adapted to contact, a second lever-arm centrally pivoted on a proper support, the lower end of which second lever-arm is adapted to contact with said bent lip, a segmental gear upon the upper end of said second lever-arm engageable with said pinion, a second segmental ratchet upon the lower end of said second lever-arm, a spring adapted to give return movement to said second lever-arm, a spring-pressed pawl engageable with the first segmental ratchet and movable by the second reciprocating bar into engagement with said first segmental ratchet and a second spring-pressed pawl engageable with the second segmental ratchet and movable by the second reciprocating bar into engagement with the second segmental ratchet, said pawls being so arranged that one is in engagement with its segmental ratchet while the other is out of engagement with its segmental ratchet and vice versa, substantially as specified.

17. In a calculating-machine, the combination of a shaft, a computing-dial, rotatably mounted on said shaft and having a concentric pinion, a second shaft, a key-register dial rotatably mounted on said second shaft and having a concentric pinion, a spring-pressed key-lever pivotally mounted on a proper support and having a downwardly-extending end, a spring-pressed reciprocating bar having a lug with which said end of the key-lever is adapted to contact, a rack-bar in continuation of said reciprocating bar, a segmental cam-gear mounted upon a proper support and engageable with said rack-bar, a gear engageable with the pinion of the computing-dial and mounted upon an oscillating arm which is adapted to rise and descend by its contact with the cam-surface of said segmental gear, a second spring-pressed reciprocating bar having a lug with which said end of the key-lever is adapted to contact, an arm pivotally mounted on said oscillating arm and movable by the first-named reciprocating bar and provided with a bent lip extending therefrom, a segmental ratchet at the lower end of said arm, a lever-arm, centrally pivoted upon a proper support, the lower end of which lever-arm is adapted to contact with said bent lip, a segmental gear upon the upper end of said lever-arm engageable with the pinion of the key-register dial, a segmental ratchet at the lower end of said lever-arm, a spring arranged to give return movement to said lever-arm, a spring-pressed pawl engageable with the first segmental ratchet and movable by the second reciprocating bar into engagement with said first segmental ratchet, and a second spring-pressed pawl engageable with the second segmental ratchet and movable by the second reciprocating bar into engagement with the second segmental ratchet, said pawls being so arranged that one is in engagement with its segmental ratchet while the other is out of engagement with its segmental ratchet and vice versa, substantially as specified.

18. In a calculating-machine, the combination of a shaft, a computing-dial rotatably mounted on said shaft and having a concentric pinion, a second shaft, a key-register dial rotatably mounted on said second shaft and having a concentric pinion, a spring-pressed key-lever pivotally mounted on a proper support and having a downwardly-extending end, a spring-pressed reciprocating bar having a lug with which said end of the key-lever is adapted to contact, a second spring-pressed reciprocating bar having a lug with which said end of the key-lever is adapted to contact, a rack-bar in continuation of said first-named reciprocating bar, an oscillating segmental gear engageable with said rack-bar and mounted on a shaft and having a cam thereon and also having a bent lip extending therefrom, an oscillating arm pivotally mounted on a fixed support and having a tubular bushing through which the shaft of said segmental gear passes, the diameter of the bore of which bushing considerably exceeds the diameter of the last-named shaft, an arm projecting from said oscillating arm and adapted to receive pressure from the bent lip of said segmental cam-gear, a spring arranged to give downward movement to said oscillating arm, a lever-arm centrally fastened on said bushing and movable with said oscillating arm, a segmental gear upon the upper end of said lever-arm engageable with the pinion of the computing-dial, a bent lip projecting from the lower part of said lever-arm, a segmental ratchet upon the lower end of said lever-arm, a second lever-arm centrally mounted on the shaft of said segmental cam-gear, the lower end of which second lever-arm is adapted to contact with the bent lip of said first lever-arm and the upper end of which second lever-arm is provided with a segmental gear engageable with the pinion of the key-register dial, a segmental ratchet at the lower end of said second lever-arm, a spring arranged to give return movement to said second lever-arm, a spring-pressed pawl engageable with the first segmental ratchet and movable by the second reciprocating bar into engagement with said first segmental ratchet, and a second spring-pressed pawl engageable with the second segmental ratchet and movable by the second reciprocating bar into engagement with the second segmental ratchet, said pawls being so arranged that one is in engagement with its segmental ratchet while the other is out of engagement with its segmental ratchet and vice versa, substantially as specified.

19. In a calculating-machine, the combination of a shaft, a computing-dial rotatably mounted on said shaft having a concentric ratchet-wheel, fastened thereon, a key-lever pivotally mounted on a proper support and having a downwardly-extending end, a spring adapted to give a return movement to the key-lever, a spring-pressed reciprocating bar having a lug with which said end of the key-lever is adapted to contact, a rack-bar in continuation of said reciprocating bar, a segmental gear mounted upon a proper support and engageable with said rack-bar and means between said segmental gear and computing-dial adapted to impart a rotary movement to said computing-dial, and a holding-pawl engageable with said ratchet-wheel for the purpose of preventing a reverse rotation of said dial, substantially as specified.

20. In a calculating-machine, the combination of a shaft a computing-dial rotatably mounted upon said shaft and having a concentric pinion and a concentric ratchet-wheel fastened thereon, a key-lever pivotally mounted on a proper support and having a downwardly-extending end, a spring adapted to give a return movement to the key-lever, a spring-pressed reciprocating bar having a lug with which said end of the key-lever is adapted to contact, a rack-bar in continuation of said reciprocating bar, a segmental cam-gear mounted on a proper support and engageable with the rack-bar, a gear engageable with said pinion of the computing-dial and mounted upon a support which is adapted to rise and descend by its contact with the cam-surface of said segmental gear, and a holding-pawl engageable with said ratchet-wheel for the purpose of preventing a reverse rotation of said dial, substantially as described.

21. In a calculating-machine, the combination of a shaft, a computing-dial rotatably mounted upon said shaft and having a concentric pinion and a concentric ratchet-wheel fastened thereon, a spring-pressed key-lever pivotally mounted on a proper support and having a downwardly-extending end, a spring-pressed reciprocating bar having a lug with which said end of the key-lever is adapted to contact, a rack-bar in continuation of said reciprocating bar, a segmental gear engageable with said rack-bar and mounted on a proper support and having a cam thereon, a gear engageable with said pinion and mounted on an oscillating arm adapted to rise by its contact with said cam for the purpose of engaging the last-named gear with said pinion, a spring arranged to depress said oscillating arm for the purpose of disengaging the said last-named gear from said pinion, and a holding-pawl engageable with said ratchet-wheel for the purpose of preventing a reverse rotation of said dial, substantially as shown.

22. In a calculating-machine, the combination of a shaft, a computing-dial rotatably mounted upon said shaft and having a concentric pinion and a concentric ratchet-wheel fastened thereon, a spring-pressed key-lever pivotally mounted on a proper support and having a downwardly-extending end, a spring-pressed reciprocating bar having a lug with which said end of the key-lever is adapted to contact, a rack-bar in continuation of said reciprocating bar, an oscillating segmental gear engageable with said rack-bar and mounted on a proper support and having a cam thereon and also having a bent lip extending therefrom, an oscillating arm pivotally mounted on a support and having a projection with which said bent lip of the segmental gear is adapted to contact, a spring arranged to give a downward movement to said oscillating arm, a gear mounted on said oscillating arm and movable thereby into and out of engagement with said pinion, and a holding-pawl engageable with said ratchet-wheel for the purpose of preventing a reverse rotation of said computing-dial, substantially as specified.

23. In a calculating-machine, the combination of a shaft, a computing-dial rotatably mounted on said shaft and having a concentric ratchet-wheel fastened thereon, a key-lever pivotally mounted on a proper support and having a downwardly-extending end, a reciprocating bar having a lug with which the said end of said key-lever is adapted to contact, means actuated by said reciprocating bar and adapted to impart a rotary movement to said computing-dial, and a holding-pawl engageable with said ratchet-wheel for the purpose of preventing an overrotation of said dial, substantially as specified.

24. In a calculating-machine, the combination of a shaft, a computing-dial rotatably mounted on said shaft having a concentric ratchet-wheel fastened thereon, a key-lever pivotally mounted on a proper support and having a downwardly-extending end, a spring adapted to give a return movement to the key, a reciprocating bar having a lug with which said end of the key-lever is adapted to contact, means actuated by said reciprocating bar and adapted to impart a rotary movement to said computing-dial, and a holding-pawl engageable with said ratchet-wheel for the purpose of preventing an overrotation of said computing-dial, substantially as described.

25. In a calculating-machine, the combination of a shaft, a computing-dial rotatably mounted on said shaft having a concentric ratchet-wheel fastened thereon, a key-lever pivotally mounted on a proper support and having a downwardly-extending end, a spring adapted to give a return movement to the key-lever, a spring-pressed reciprocating bar having a lug with which said end of the key-lever is adapted to contact, a rack-bar in continuation of said reciprocating bar, a segmental gear mounted upon a proper support and engageable with said rack-bar, means between said segmental gear and computing-dial adapted to impart a rotary movement to said computing-dial, and a holding-pawl engageable with said ratchet-wheel for the purpose of preventing an overrotation of said computing-dial, substantially as specified.

26. In a calculating-machine, the combination of a shaft, a computing-dial rotatably mounted upon said shaft and having a concentric pinion and a concentric ratchet-wheel fastened thereon, a key-lever pivotally mounted on a proper support and having a downwardly-extending end, a spring adapted to give a return movement to the key-lever, a spring-pressed reciprocating bar having a lug with which said end of the key-lever is adapted to contact, a rack-bar in continuation of said reciprocating bar, a segmental cam-gear mounted on a proper support and engageable with the rack-bar, a gear engageable with said pinion of the computing-dial and mounted upon a proper support which is adapted to rise and descend by its contact with the cam-surface of said segmental gear, and a holding-pawl engageable with said ratchet-wheel for the purpose of preventing an overrotation of said computing-dial, substantially as described.

27. In a calculating-machine, the combination of a shaft, a computing-dial rotatably mounted upon said shaft and having a concentric pinion and a concentric ratchet-wheel fastened thereon, a spring-pressed key-lever pivotally mounted on a proper support and having a downwardly-extending end, a spring-pressed reciprocating bar having a lug with which said end of the key-lever is adapted to contact, a rack-bar in continuation of the reciprocating bar, a segmental gear engageable with said rack-bar and mounted on a proper support and having a cam thereon, a gear engageable with said pinion and mounted on an oscillating arm adapted to rise by its contact with said cam for the purpose of engaging the last-named gear with said pinion, and a spring arranged to depress said oscillating arm for the purpose of disengaging the said last-named gear from said pinion, and a holding-pawl engageable with said ratchet-wheel for the purpose of preventing an overrotation of said computing-dial, substantially as shown.

28. In a calculating-machine, the combination of a shaft, a computing-dial rotatably mounted upon said shaft and having a concentric pinion and a concentric ratchet-wheel fastened thereon, a spring-pressed key-lever pivotally mounted on a proper support and having a downwardly-extending end, a spring-pressed reciprocating bar having a lug with which said end of the key-lever is adapted to contact, a rack-bar in continuation of the reciprocating bar, an oscillating segmental gear engageable with said rack-bar and mounted on a proper support and having a cam thereon and also having a bent lip extending therefrom, an oscillating arm pivotally mounted on a support and having a projection with which said bent lip of the segmental gear is adapted to contact, a spring arranged to give a downward movement to said oscillating arm and movable thereby into and out of engagement with said pinion, and a holding-pawl engageable with said ratchet-wheel for the purpose of preventing an overrotation of said computing-dial, substantially as specified.

29. In a calculating-machine, the combination of a shaft, a computing-dial rotatably mounted on said shaft and having two concentric ratchet-wheels fastened thereon, one of which is adapted to prevent overrotation of said dial and the other of which is adapted to prevent a reverse rotation of said dial, a key-lever pivotally mounted on a proper support and having a downwardly-extending end, a reciprocating bar having a lug with which the said end of said key-lever is adapted to contact, means actuated by said reciprocating bar and adapted to impart a rotary movement to said computing-dial, a holding-pawl engageable with one of said ratchet-wheels, and a holding-pawl engageable with the other of said ratchet-wheels, substantially as specified.

30. In a calculating-machine, the combination of a shaft, a computing-dial rotatably mounted on said shaft and having two concentric ratchet-wheels fastened thereon, one of which is adapted to prevent overrotation of said dial and the other of which is adapted to prevent a reverse rotation of said dial, a key-lever pivotally mounted on a proper support and having a downwardly-extending end, a spring adapted to give a return movement to the key, a reciprocating bar having a lug with which said end of the key-lever is adapted to contact, means actuated by said reciprocating bar and adapted to impart a rotary movement to said computing-dial, a holding-pawl engageable with one of said ratchet-wheels, and a holding-pawl engageable with the other of said ratchet-wheels, substantially as described.

31. In a calculating-machine, the combination of a shaft, a computing-dial rotatably mounted on said shaft, and having two concentric ratchet-wheels fastened thereon, one of which is adapted to prevent overrotation of said dial and the other of which is adapted to prevent a reverse rotation of said dial, a key-lever pivotally mounted on a proper support and having a downwardly-extending end, a spring adapted to give a return movement to the key-lever, a spring-pressed reciprocating bar having a lug with which said end of the key-lever is adapted to contact, a rack-bar in continuation of said reciprocating bar, a segmental gear mounted upon a proper support and engageable with said rack-bar, means between said segmental gear and computing-dial adapted to impart a rotary movement to said computing-dial, a holding-pawl engageable with one of said ratchet-wheels, and a holding-pawl engageable with the other of said ratchet-wheels, substantially as specified.

32. In a calculating-machine, the combination of a shaft, a computing-dial rotatably mounted upon said shaft and having a concentric pinion and also two concentric ratchet-wheels fastened thereon, one of which ratchet-wheels is adapted to prevent overrotation of said dial and the other of which ratchet-wheels is adapted to prevent a reverse rotation of said dial, a key-lever pivotally mounted on a proper support and having a downwardly-extending end, a spring adapted to give a return movement to the key-lever, a spring-pressed reciprocating bar having a lug with which said end of the key-lever is adapted to contact, a rack-bar in continuation of said reciprocating bar, a segmental cam-gear mounted on a proper support and engageable with said pinion of the computing-dial and mounted upon a support which is adapted to rise and descend by its contact with the cam-surface of said segmental gear, a holding-pawl engageable with one of said ratchet-wheels, and a holding-pawl engageable with the other of said ratchet-wheels, substantially as described.

33. In a calculating-machine, the combination of a shaft, a computing-dial rotatably mounted upon said shaft and having a concentric pinion and also two concentric ratchet-wheels fastened thereon, one of which ratchet-wheels is adapted to prevent overrotation of said dial and the other of which ratchet-wheels is adapted to prevent a reverse rotation of said dial, a spring-pressed key-lever pivotally mounted on a proper support and having a downwardly-extending end, a spring-pressed reciprocating bar having a lug with which said end of the key-lever is adapted to contact, a rack-bar in continuation of said reciprocating bar, a segmental gear engageable with said rack-bar and mounted on a proper support and having a cam thereon, a gear engageable with said pinion and mounted on an oscillating arm adapted to rise by its contact with said cam for the purpose of engaging the last-named gear with said pinion, a spring arranged to depress said oscillating arm for the purpose of disengaging the said last-named gear from said pinion, a holding-pawl engageable with one of said ratchet-wheels and a holding-pawl engageable with the other of said ratchet-wheels, substantially as shown.

34. In a calculating-machine, the combination of a shaft, a computing-dial rotatably mounted upon said shaft and having a concentric pinion and also two concentric ratchet-wheels fastened thereon, one of which ratchet-wheels is adapted to prevent overrotation of said dial and the other of which ratchet-wheels is adapted to prevent a reverse rotation of said dial, a spring-pressed key-lever pivotally mounted on a proper support and having a downwardly-extending end, a spring-pressed reciprocating bar having a lug with which said end of the key-lever is adapted to contact, a rack-bar in continuation of said reciprocating bar, an oscillating segmental gear engageable with said rack-bar and mounted on a proper support and having a cam thereon and also having a bent lip extending therefrom, an oscillating arm pivotally mounted on a support and having a projection with which said bent lip of the segmental gear is adapted to contact, a spring arranged to give a downward movement to said oscillating arm, a gear mounted on said oscillating arm and movable thereby into and out of engagement with said pinion, a holding-pawl engageable with one of said ratchet-wheels, and a holding-pawl engageable with the other of said ratchet-wheels, substantially as specified.

35. In a calculating-machine, the combination of a shaft, a computing-dial rotatably mounted on said shaft and having a volute-shaped cam fastened on the side of said dial and rotatable therewith, a second computing-dial rotatably mounted on said shaft beside the first-named dial and having a concentric ratchet-wheel fastened thereon on the side adjacent to the first-named dial, a spring-pressed lever-arm with which said cam is adapted to contact, a segmental gear upon said lever-arm, a second shaft, a segmental gear rotatably mounted on said second shaft and engageable with the first segmental gear and having an integral radial arm, a pawl pivotally mounted on the outer end of said radial arm and engageable with said ratchet-wheel of the second dial and a key mechanism with means adapted to rotate the first-named dial, substantially as shown.

36. In a calculating-machine, the combination of a shaft, a computing-dial rotatably mounted on said shaft and having a volute-shaped cam fastened on the side of said dial, a second computing-dial rotatably mounted on said shaft beside the first-named dial and having a concentric ratchet-wheel fastened thereon on the side adjacent to the first-named dial, a spring-pressed lever-arm with which said cam is adapted to contact, a segmental gear upon said lever-arm, a second shaft, a segmental gear rotatably mounted on said second shaft and engageable with the first-named segmental gear and having an integral radial arm, a curved pawl centrally pivoted on the outer end of said radial arm and engageable with said ratchet-wheel of the second dial, and provided at its upper end with a knob, and a key mechanism with means adapted to rotate the first-named dial, substantially as set forth.

37. In a calculating-machine, the combination of a shaft, a computing-dial rotatably mounted on said shaft and having a volute-shaped cam fastened on one side of said dial, a second computing-dial rotatably mounted on said shaft beside the first-named dial and having a concentric ratchet-wheel fastened thereon on the side adjacent to the first-named dial, a spring-pressed lever-arm with which said cam is adapted to contact, a segmental gear upon said lever-arm, a second shaft, a segmental gear rotatably mounted on said second shaft and engageable with the first-named segmental gear and having an integral radial arm, a carrier-pawl pivotally mounted on the outer end of said radial arm and engageable with said ratchet-wheel of the second dial, a holding-pawl pivotally mounted upon a proper support and engageable with said ratchet-wheel of the second dial for the purpose of normally preventing an overrotation of said second dial, means adapted to disengage said holding-pawl from said ratchet-wheel temporarily while said carrier-pawl is operatively engaged with said ratchet-wheel, and a key mechanism with means adapted to rotate the first-named dial, substantially as described.

38. In a calculating-machine, the combination of a shaft, a computing-dial rotatably mounted on said shaft and having a volute-shaped cam fastened on the side of said dial and rotatable therewith, a second computing-dial rotatably mounted on said shaft beside the first-named dial and having a concentric ratchet-wheel fastened thereon on the side adjacent to the first-named dial, a bent lever-arm pivotally mounted on a proper support and adapted to contact with said cam, a segmental gear upon said lever-arm, a second shaft, a segmental gear rotatably mounted on said second shaft and engageable with the first-named segmental gear and having an integral radial arm, a pawl pivotally mounted on the outer end of said radial arm and engageable with said ratchet-wheel of the second-named dial, a key mechanism with means adapted to rotate the first-named dial, a screw mounted in a proper support, a yoke having a screw-threaded aperture with which said screw is engageable and a spiral spring extending from said yoke to the downward end of said bent lever, substantially as specified.

39. In a calculating-machine, the combination of a shaft, a computing-dial rotatably mounted on said shaft and having a volute-shaped cam fastened on one side of said dial, and a concentric pinion on the opposite side of said dial, a second computing-dial rotatably mounted on said shaft beside the first-named dial and having a concentric ratchet-wheel fastened thereon on the side adjacent to the first-named dial, a spring-pressed lever-arm with which said cam is adapted to contact, a segmental gear upon said lever-arm, a second shaft, a segmental gear rotatably mounted on said second shaft and engageable with the first-named segmental gear and having an integral radial arm, a carrier-pawl pivotally mounted on the outer end of said radial arm and engageable with said ratchet-wheel of the second dial, a holding-pawl having a downward projection and pivotally mounted upon a proper support and engageable with said ratchet-wheel of the second dial, a spring-pressed key-lever pivotally mounted upon a proper support and having a downwardly-extending end, a spring-pressed reciprocating bar having a lug with which said end of the key-lever is adapted to contact, a rack-bar in continuation of said reciprocating bar, an oscillating segmental gear engageable with said rack-bar and mounted on a proper support and having a cam thereon and also having a bent lip extending therefrom, an oscillating arm pivotally mounted upon a fixed support and provided with a spring for return movement and having two upward projections with one of which said bent lip of the segmental gear is adapted to contact and the second of which is adapted to contact with the downward projection of said holding-pawl and a gear mounted on said oscillating arm and movable thereby into and out of engagement with the said pinion of the first computing-dial, substantially as described.

40. In a calculating-machine, the combination of a properly-mounted rod, a lever-arm mounted at one end upon said rod, a bent lever mounted at its bend upon said rod and having one end thereof extending downward, a key-bar mounted on the free ends of said levers, a spring adapted normally to maintain said key-bar in an elevated position, a rock-shaft mounted in the frame of the machine and having a flat face, a lever-arm fastened to one end of said rock-shaft, a second bent lever pivotally mounted at its bend upon said frame and having its rear end in contact with the lever-arm of said rock-shaft and its forward end extending angularly upward, a rod connecting said forward end of said second bent lever with the downward end of the first bent lever, a key-register dial rotatably mounted on a shaft and having a concentric pinion, a spring-pressed key-lever mounted on a proper support and having a downwardly-extending end, a reciprocating bar provided with a spring and having a lug with which said downward end of the key-lever is adapted to contact, a spring-pressed lever centrally pivoted upon a proper support and having a segmental gear upon its upper end engageable with said pinion and a segmental ratchet on its lower end, means between the last-named lever and said reciprocating bar adapted to give oscillating movement to the former and a spring-pressed pawl pivotally mounted on said frame and having a rear upward arm in contact with the flat face of said rock-shaft and also having its forward end engageable with said segmental ratchet, substantially as shown.

41. In a calculating-machine, the combination of a knob rotatably mounted in the case or frame of the machine and having a shaft to which it is fastened, a cam mounted on said shaft, a ratchet-gear upon said shaft, a spring-pressed pawl mounted on the side of said cam and engageable with said ratchet-gear, a pivotally-mounted lever-arm upon said frame having an arm extending therefrom whose end is in operative contact with said cam, a rock-shaft mounted in said frame and having a flat face, a lever-arm centrally fastened to one end of said rock-shaft and having its upper end in contact with the lower end of the first lever-arm, a spring extending from the lower end of the second lever-arm to a fixed pin, a key-register dial rotatably mounted on a shaft and having a concentric pinion, a spring-pressed key-lever mounted on a proper support and having a downwardly-extending end, a reciprocating bar provided with a spring and having a lug with which said downward end of the key-lever is adapted to contact, a spring-pressed lever centrally pivoted upon a proper support and having at its upper end a segmental gear engageable with said pinion and at its lower end a segmental ratchet, means between said last-named lever and said reciprocating bar adapted to give oscillating movement to the former, and a spring-pressed pawl pivotally mounted on said frame and having a rear upward arm in contact with the flat face of said rock-shaft and also having its forward end engageable with said segmental ratchet, substantially as described.

42. In a calculating-machine, the combination of a knob rotatably mounted in the case or frame of the machine and having a shaft to which it is fastened, a cam mounted on said shaft, a ratchet-gear upon said shaft, a spring-pressed pawl mounted on the side of said cam and engageable with said ratchet-gear, a pivotally-mounted lever-arm upon said frame having an arm extending therefrom whose end is in operative contact with said cam, a rocker-bar having at its ends earpieces which are pivotally mounted on said frame, and one of which earpieces has its lower end in operative contact with the upper end of said lever-arm, a spring from the lower end of said earpiece to a fixed pin, a shaft having a slot therein, a computing-dial loosely mounted upon the last-named shaft and having a concentric ratchet-gear, a spring-pressed pawl mounted on the side of said dial and adapted to engage in the slot of the last-named shaft, a spring-pressed holding-pawl pivotally mounted on said frame and having its rear free end normally in contact with the lower edge of said rocker-bar and its front end engageable with the ratchet-gear of said dial, a spring-pressed key-lever pivotally mounted on a proper support and having a downwardly-extending end, a reciprocating bar having a lug with which said downward end of the key-lever is adapted to contact and means between said reciprocating bar and dial adapted to impart a rotary movement to the latter, substantially as specified.

43. In a calculating-machine, the combination of a rotatable key-register dial, key mechanism adapted to actuate the same in one direction and a setback mechanism arranged and adapted to rotate said dial in the opposite direction, substantially as shown.

44. In a calculating-machine, the combination of a rotatable computing-dial having a ratchet-gear, key mechanism adapted to rotate said dial, a holding-pawl engageable with said ratchet-gear, a rotatable shaft having a knob for the turning thereof, a cam on said shaft and a tripping device adapted to disengage said pawl from said ratchet and operative by said cam, substantially as described.

45. In a calculating-machine, the combination of a rotatable key-register dial, a computing-dial having a ratchet-gear, key mechanism adapted to actuate said key-register dial and said computing-dial, a holding-pawl engageable with said ratchet-gear, a rotatable shaft having a knob for the turning thereof, a cam on said shaft, a tripping device operative by said cam and adapted to disengage said pawl from said ratchet and a setback mechanism operative by said cam and adapted to give reverse rotation to said key-register dial, substantially as set forth.

46. In a calculating-machine, the combination of a knob rotatably mounted in the case or frame of the machine and having a shaft to which it is fastened, an intermittent gear fastened on said shaft, a second shaft having a slot therein, a computing-dial loosely mounted on said second shaft and having a concentric ratchet-gear, a spring-pressed pawl mounted on the side of said dial and adapted to engage in the slot of said second shaft, a spring-pressed holding-pawl pivotally mounted on said frame and engageable with the ratchet-gear of said dial, a second intermittent gear fast on said second shaft and engageable with the first intermittent gear, a cam on said first shaft and a tripping device operative by said cam and adapted to disengage said holding-pawl from the ratchet-gear of said computing-dial, substantially as specified.

In testimony whereof I affix my signature in presence of two witnesses.

JOSEPH A. TURCK.

Witnesses:
 FRANK E. LORD,
 WARREN R. PERCE.